United States Patent [19]

Limberg

[11] 3,798,376

[45] Mar. 19, 1974

[54] MULTIPLEX DECODING SYSTEM

[75] Inventor: Allen Leroy Limberg, Somerville, N.J.

[73] Assignee: RCA Corporation, New York, N.Y.

[22] Filed: Jan. 18, 1972

[21] Appl. No.: 218,786

Related U.S. Application Data

[63] Continuation of Ser. No. 888,308, Dec. 29, 1969.

[52] U.S. Cl. ................................ 179/15 BT, 329/50

[51] Int. Cl. ............................................ H04h 5/00

[58] Field of Search .......... 179/15 BT; 329/50, 122, 329/121; 331/25, 17

[56] References Cited

UNITED STATES PATENTS

| | | | |
|---|---|---|---|
| 3,564,434 | 2/1971 | Camenzind | 329/122 |
| 3,363,194 | 1/1968 | Hileman | 331/17 |
| 3,328,719 | 6/1967 | De Lisle | 331/17 |
| 3,495,184 | 2/1970 | Perkins | 331/25 |
| 3,514,720 | 5/1970 | Roucache | 329/50 |
| 3,043,914 | 7/1962 | Collins | 179/15 BT |
| 3,089,095 | 5/1963 | Webb | 179/15 BT |
| 3,109,896 | 11/1963 | Boothroyd | 179/15 BT |
| 3,584,154 | 6/1971 | McShan | 179/15 BT |
| 3,133,993 | 5/1964 | De Vries | 179/15 BT |
| 3,209,270 | 9/1965 | De Vries | 179/15 BT |
| 3,466,399 | 9/1969 | Dias | 179/15 BT |

*Primary Examiner*—Kathleen H. Claffy
*Assistant Examiner*—Thomas D'Amico
*Attorney, Agent, or Firm*—Eugene M. Whitacre; Kenneth R. Schaefer

[57] ABSTRACT

A decoder circuit for stereophonic FM broadcast receivers adapted for construction by integrated circuit techniques. A local oscillator arranged to operate at an even harmonic of the 19 KHz stereo pilot signal is locked in phase and frequency to the pilot signal by means of an automatic frequency and phase control (AFPC) loop. The AFPC loop includes frequency dividing means coupled to the oscillator output and balanced synchronous detection means coupled to the output of the frequency dividing means and to a source of composite stereophonic signals (including the pilot signal) for producing oscillator control signals. Additional synchronous detection means are coupled to the source of composite signals and to further frequency dividing means for producing indications of pilot signal presence and above-band noise and for demodulating the difference channel (L—R) information. Matrixing and sterophonic-monophonic switching means are also incorporated in the decoder system.

34 Claims, 9 Drawing Figures

Fig. I

INVENTOR.
ALLEN L. LIMBERG
BY
Kenneth R. Schaefer
ATTORNEY

INVENTOR.
ALLEN L. LIMBERG
BY
Kenneth R. Schaefer
ATTORNEY

INVENTOR.
ALLEN L. LIMBERG
BY
Kenneth R. Schaefer
ATTORNEY

INVENTOR.
ALLEN L. LIMBERG
BY
Kenneth R. Schaefer
ATTORNEY

INVENTOR.
ALLEN L. LIMBERG
BY
Kenneth R. Schaefer
ATTORNEY

INVENTOR.
ALLEN L. LIMBERG
BY
Kenneth R. Schaefer
ATTORNEY

INVENTOR.

ALLEN L. LIMBERG

BY

Kenneth R. Schaefer

ATTORNEY

INVENTOR.
ALLEN L. LIMBERG
BY
ATTORNEY

INVENTOR.
ALLEN L. LIMBERG
BY
Kenneth R. Schaefer
ATTORNEY

MULTIPLEX DECODING SYSTEM

This is a continuation of application Ser. No. 888,308, filed Dec. 29, 1969.

This invention relates to stereophonic multiplex radio receiver systems and, in particular, to a stereo multiplex detector or decoder circuit particularly adapted for fabrication by integrated circuit techniques.

In the system presently employed in the United States for stereophonic FM broadcasting, a main carrier wave is frequency modulated by the sum of two stereophonically related left (L) and right (R) audio frequency signals, the carrier wave being adapted for compatible reception by either monophonic or stereophonic FM radio receivers. The main carrier wave is modulated further with stereophonic information in the form of a suppressed subcarrier wave amplitude modulated with the difference of the two stereophonically related audio signals (L-R), a continuous pilot signal for use in demodulating the suppressed subcarrier wave at the receiver and, in some instances, an additional commercial background music (SCA) frequency modulated subcarrier wave.

In a conventional stereophonic FM receiver, a composite signal is produced at the output of a frequency modulation detector, the composite signal comprising the sum (L+R) audio signal component usable either by monophonic or stereophonic FM receivers and extending within a frequency range of, for example, 0 to 15,000 Hertz (Hz), a 19 Kilohertz (KHz) pilot signal and sidebands of a suppressed 38 KHz subcarrier representative of the difference (L−R) signal component extending within a frequency range of 23 to 53 KHz. The composite signal also may include a 67 KHz background music (SCA) frequency modulated subcarrier and its sidebands extending, for example, from 59 to 75 KHz. This "storecasting" component generally is removed in home receivers by tuned filter circuits.

In order to reproduce the stereophonic audio program material in the home receiver, the 19 KHz pilot signal customarily is separated from the remainder of the composite signal by further tuned filter circuits and a 38 KHz carrier wave is generated in timed relation with the 19 KHz pilot signal for recombination with and demodulation of the suppressed subcarrier difference signal sideband information. The generation of the 38 KHz subcarrier wave and its recombination with the difference signal information customarily entails the use of several inductive components (i.e., coils and/or transformers). These and other inductive components required in the aforementioned tuned filter circuits are relatively bulky and costly. Such components add to the difficulty of manufacturing receivers since they usually must be adjusted, thereby requiring complex electronic test equipment for the manufacture of the receivers. If a plurality of inductive components are used, they must be physically located one with respect to the others so as to minimize undesired interaction between their field patterns.

Furthermore, the tuned bandpass filter circuits normally used for separation of the pilot signal and for reconstruction of the 38 KHz subcarrier difference signal are relatively high Q circuits and therefore are characterized by marked phase sensitivity. That is, a relatively small misalignment or shift in the resonant frequency of the tuned circuit causes a relatively large change in the phase response of the filter with respect to signals at the nominal tuned frequency (19 KHz or 38 KHz). In the case of a stereophonic FM decoder, such a change in phase response of a filter results in degradation of the separation of the left and right stereophonically related signals (i.e., crosstalk is introduced). Misalignment of this type is often caused by changes in inductive or capacitive values caused by operating temperature variations or component aging.

It is therefore an object of the present invention to provide an FM stereo multiplex decoder circuit utilizing relatively few inductive components.

Relatively low level signals of the type described above which are encountered in stereophonic FM decoding circuits advantageously may be processed utilizing monolithic integrated circuit chips (i.e., solid state structures wherein a plurality of active semiconductor devices, such as transistors and diodes, and passive circuit components, such as capacitors and resistors, are simultaneously constructed and interconnected on a common substrate of semiconductor material). Such integrated circuit techniques offer size, weight, reliability and, in many instances, economic advantages when compared with the conventional assembly of circuit arrangements using discrete devices.

In the design of integrated circuits, as compared to circuits utilizing discrete devices, different economic ground rules are followed. For example, while discrete device circuit design places a premium on a minimum number of the relatively costly discrete active devices, such devices are not relatively costly in the intergrated circuit domain. In the latter case, it is particularly desirable to perform functions on the chip with minimal resort to external or outboard components. Some of the advantages of integrated circuits are compromised, for example, where coils and/or transformers are interconnected with chips. In addition to the cost, size, weight and reliability factors suffering, one or more of the relatively few terminals available on a typical chip (e.g., 16 terminals) will be required for interconnection with each inductive device. Furthermore, because of the relatively small physical dimensions of a chip (e.g., of the order of 0.1 inches by 0.1 inches square or less), and the consequent close spacing of leads for external devices, it is desirable to minimize the number of external leads which are required to carry alternating signal currents and thereby reduce problems associated with unwanted coupling between various sections of the chip. In particular, in a stereophonic FM decoder chip, it is desirable to process the 19 KHz and 38 KHz signals all within the chip area so as to prevent coupling of improperly phased signals to the 38 KHz regeneration circuits since, as was noted above, phase errors in the 38 KHz subcarrier wave result in crosstalk between the left and right audio channels.

It is therefore desirable, when performing frequency selection (i.e., bandpass) functions with an integrated circuit, to utilize active device configurations devoid of inductive components. Such frequency selection functions may be performed by heterodyning a particular signal component with a corresponding locally generated carrier signal so as to produce an output difference-frequency signal referenced to zero frequency. The difference-frequency signal then may be filtered by simple R-C filter circuits. This type of frequency selection advantageously may be performed with integrated circuits by means of amplifiers arranged as balanced synchronous detectors.

In accordance with one aspect of the present invention; a stereophonic multiplex decoder circuit comprises a single oscillator tuned to a harmonic of a 19 KHz stereo pilot signal. An automatic frequency and phase control (AFPC) system associated with the oscillator comprises frequency divider means coupled to the oscillator for producing a reference waveform in timed relation with and at a subharmonic (nominally 19 KHz) of the oscillator waveform. In a preferred embodiment, the frequency divider means is devoid of inductors. The AFPC system further comprises a synchronous detector circuit to which the reference waveform and detected composite signal including the received pilot signal are applied to produce a direct voltage representative of the phase difference between the reference and pilot waveforms. Control means are coupled to the detector circuit and are responsive to the phase error-representative direct voltage for varying the phase and/or frequency of the oscillator to attain aand maintain the oscillator output waveform at the predetermined harmonic of and in predetermined timed relation with respect to the received pilot signal waveform.

In accordance with a further aspect of the present invention, means are coupled to the oscillator for providing a subcarrier waveform at a 38 KHz rate in predetermined timed relation with respect to the 19 KHz pilot waveform for demodulation of the stereo difference signal (L−R) components. A second synchronous detector circuit to which the 38 KHz subcarrier waveform and the detected composite signal including the received difference signal sidebands are applied produces first and second outputs representative of oppositely phased audio difference signal components components R) and − (L−R). The oppositely phased audio difference signal components and the detected composite signal including the audio sum signal component (L+R) are applied to signal matrixing means for producing separated left (L) and right (R) audio signal components for reproduction by suitable means such as loudspeakers.

In stereophonic FM receivers, it is also desirable to provide an indication to the listener of when stereophonic broadcast material is being received. It is customary to provide such an indication by causing a light to be energized when a pilot signal of suitable amplitude and duration is present in the received signal.

In accordance with a further aspect of the present invention, stereo indicator means are provided comprising means coupled to the oscillator for producing a further 90 KHz waveform in phase quadrature relationship (90° out of phase) with respect to the reference waveform supplied to the AFPC detector. In a preferred embodiment, the quadrature wave producing means is devoid of inductors. A third synchronous detector circuit is provided with the quadrature 19 KHz waveform and with the composite signal including the received pilot signal waveform for producing output in response to continued presence of pilot signal. This output is coupled to indicator means for producing a visual indication of reception of a stereophonic broadcast material.

It is also well known that in order to produce an acceptable stereophonic audio signal, the signal-to-noise ratio of a received FM broadcast signal must be higher than for acceptable monophonic listening. It therefore may be preferable from the listener's viewpoint to reproduce received stereophonic signals monophonically under certain reception conditions.

In accordance with a further aspect of the present invention, means are provided for measuring signal-to-noise ratio of a received composite signal and for automatically switching to monophonic reception when the signal is too noisy for acceptable stereophonic reproduction. In a preferred embodiment, the single oscillator of the decoder circuit is arranged to operate at a frequency which is an even multiple of the received pilot (19 KHz) signal, the even multiple being selected so that the oscillator frequency is greater than or above-band with respect to the frequency of any signal component of the composite stereo signal (e.g., at the 6th or 12th harmonic of the pilot signal). A fourth synchronous detector circuit is provided with an above-band reference wave derived from the oscillator output and with the detected composite signal including noise components. A relatively low frequency output of the detector circuit representative of noise is compared to a predetermined acceptable noise threshold. A stereophonic disabling signal representative of the presence of noise above the threshold is provided to a stereo indicator and/or to automatic stereo switching apparatus to permit switching of the receiver to monophonic operation when the processed composite signal is too noisy for acceptable stereophonic reproduction.

In a preferred embodiment of the invention, a single oscillator is arranged to operate at a frequency which is an even harmonic of the pilot signal, an even harmonic of the stereo difference subcarrier wave and above the highest signal frequency component of the composite signal. A plurality of non-inductive frequency divider means are coupled to the oscillator for providing four harmonically related reference signals to four synchronous detectors. The synchronous detectors are also supplied with detected composite signals and are arranged respectively, to maintain the oscillator in predetermined timed relation with the pilot signal component of the composite signal, to provide indications of the presence of the pilot signal component, to detect the stereophonic difference signal component of the composite signal and to provide an indication of the presence of above-band noise components in the composite signal.

For a better understanding of the present invention, together with various objects thereof, reference should be made to the following specification and the attached drawing in which.

Figure 1:
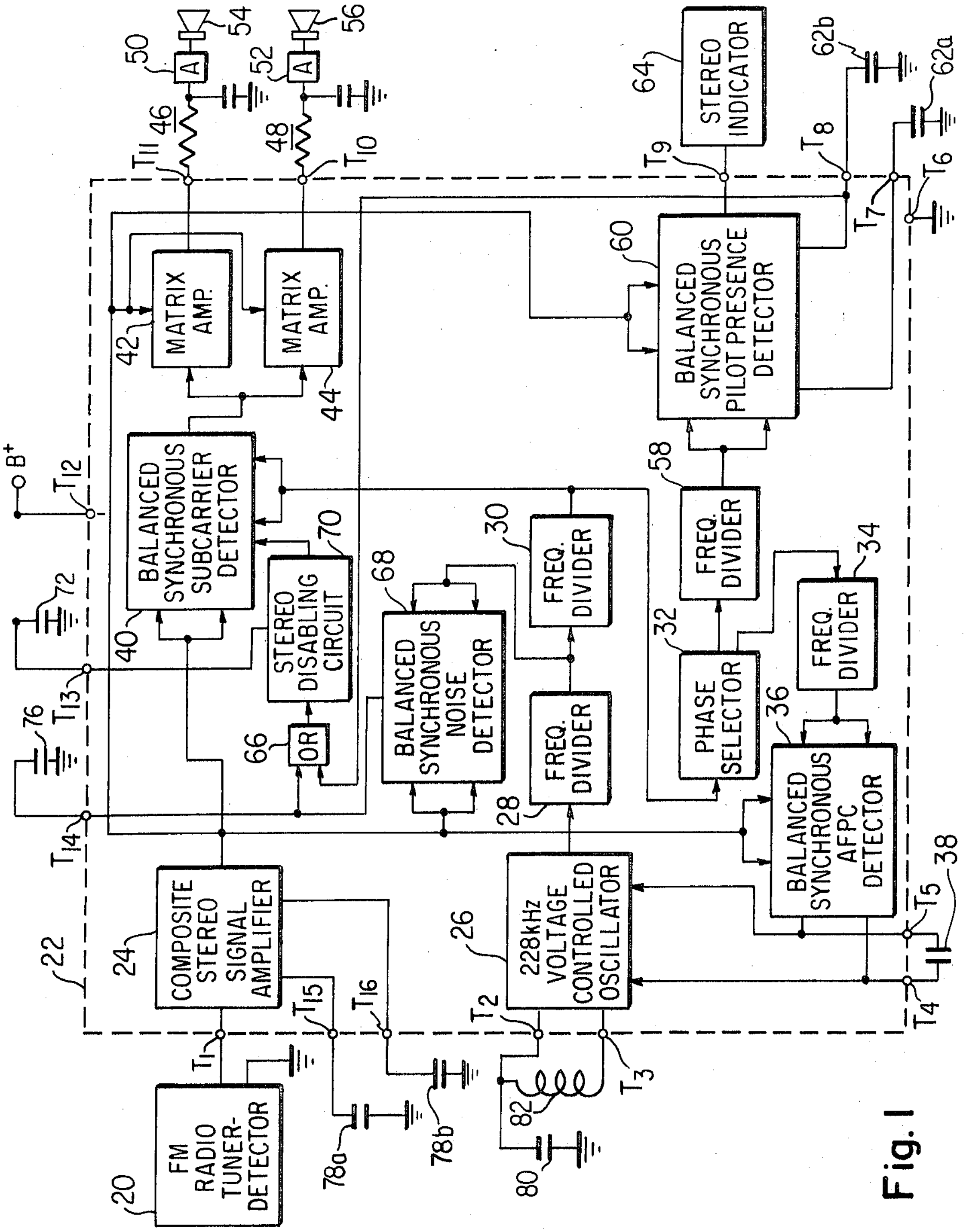
FIG. 1 illustrates, in block diagram form, an FM radio receiver employing an FM stereophonic decoder circuit constructed in accordance with the several aspects of the present invention.
Figure 8:
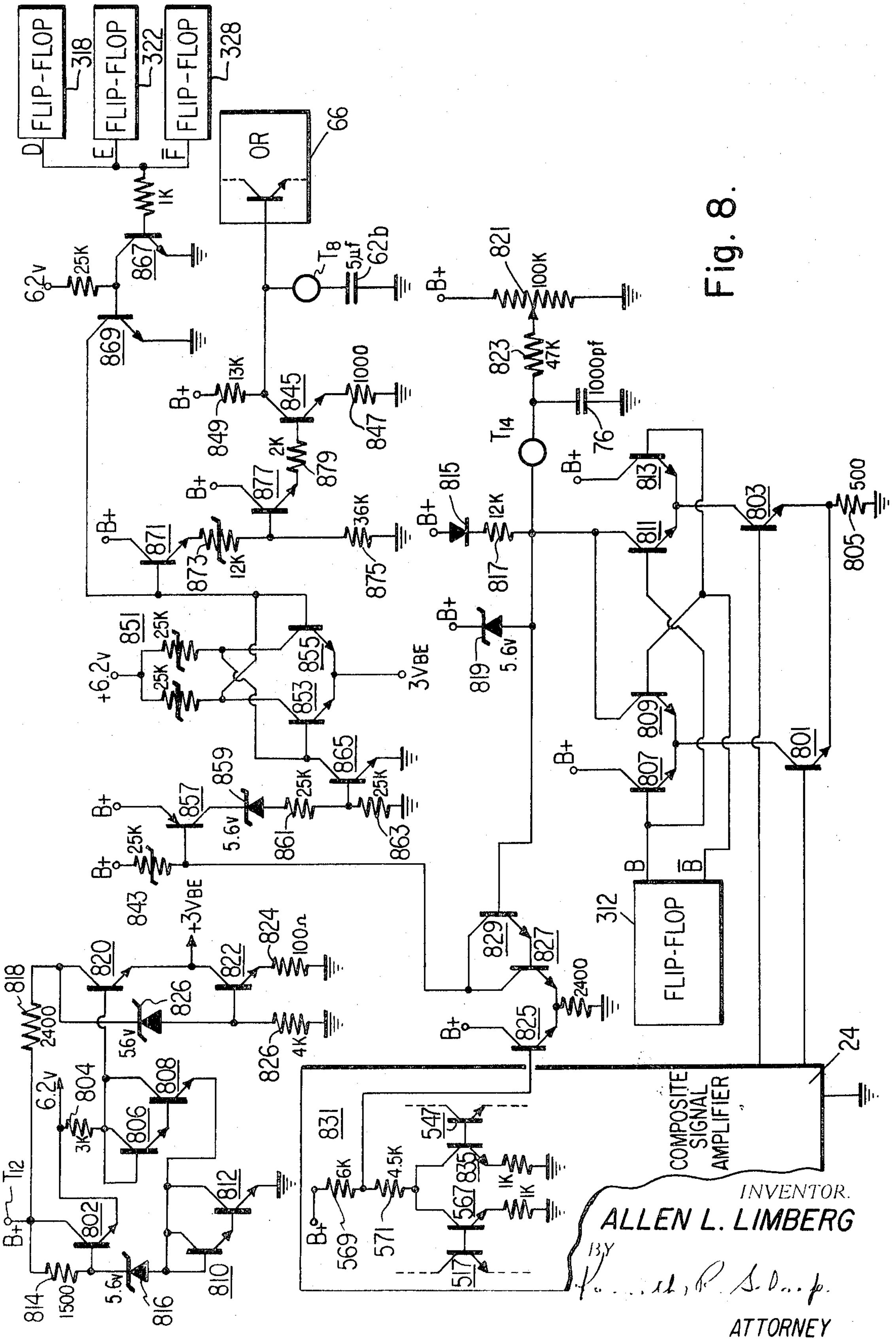
Figure 9:
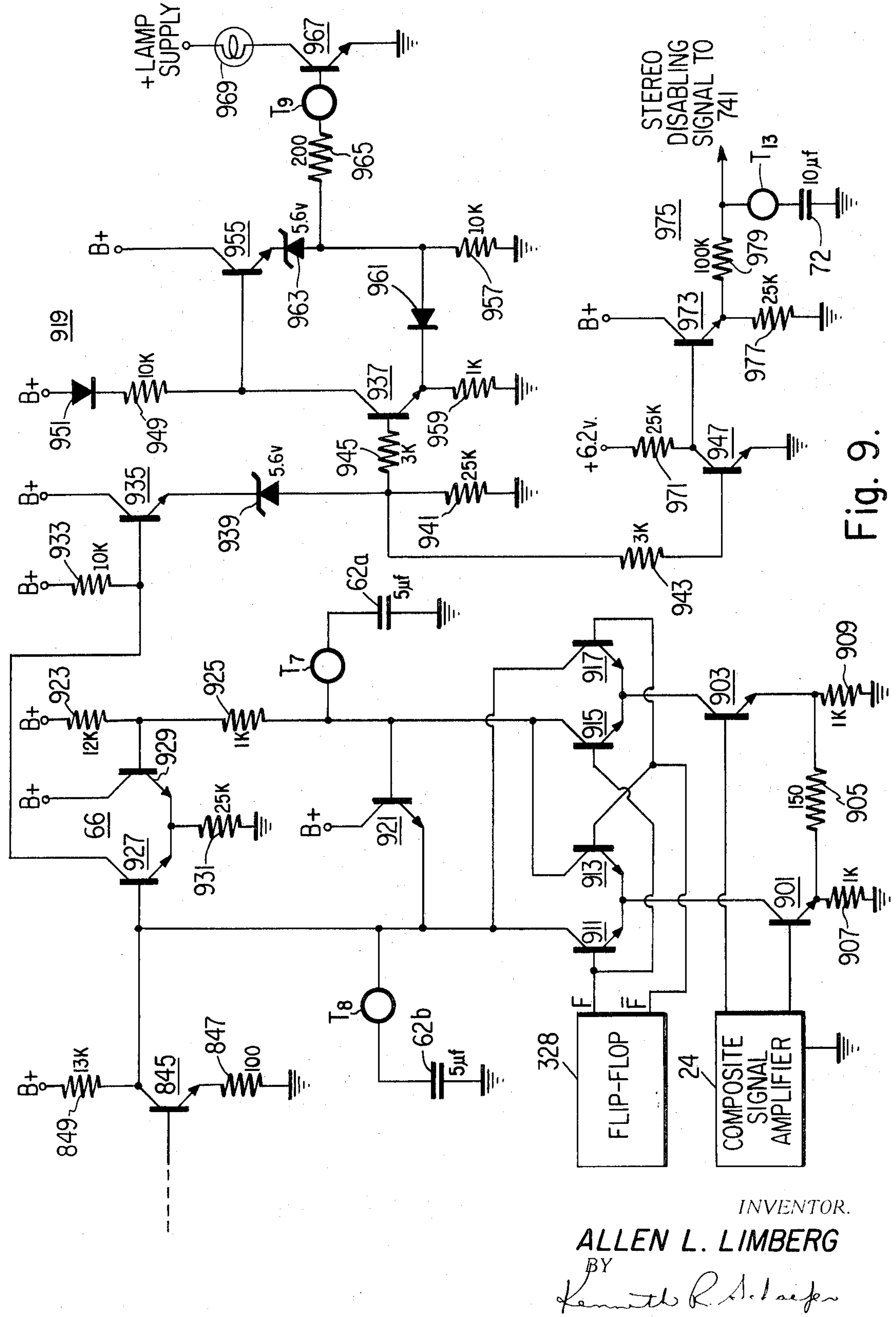

FIG. 8 is a schematic circuit diagram of a balanced synchronous above-band noise detector and an associated voltage supply adapted for construction in integrated circuit form for use with the system shown in FIG. 1; and FIG. 9 is a schematic circuit diagram of a balanced synchronous pilot signal presence detector and an associated stereophonic reception indicator and switching system adapted for construction in integrated form for use in the system shown in FIG. 1.

Referring to FIG 1, an FM radio receiver adapted for reception of monophonic or stereophonic broadcast material is illustrated in simplified block diagram form. In FIG. 1, numerous signal paths are illustrated by means of a single line originating at one block and, before termination at another block, the single line is split into two lines. It should be understood that this symbol indicates coupling of push-pull signals (i.e., two signals 180° out of phase but otherwise substantially identical) from the originating block to the terminating block. The illustrated radio receiver comprises an FM tuner-detector 20 of conventional form for selectively receiving, amplifying and detecting FM broadcast material. FM tuner-detector 20 produces at an input terminal $T_1$ of an FM stereophonic decoder circuit 22 either an audio frequency sum (L+R) signal in the case of reception of monophonic broadcast material or, in the case of reception of stereophonic broadcast material, a composite stereophonic signal comprising a sum (L+R) signal, a pilot (19 KHz) signal, and a suppressed subcarrier difference (L−R) signal. In either case, FM background (SCA) music signals also may be present at input terminal $T_1$.

For convenience, the signal supplied to terminal $T_1$ will be referred to as a composite signal in all cases. In stereo decoder 22, all elements included within the dashed outline may be and preferably are constructed in integrated form on a single semi-conductor substrate. Terminals $T_1$ to $T_{16}$ are provided on the integrated circuit "chip" for connection to external components, signal sources or other circuits.

The detected composite signal supplied to terminal $T_1$ of decoder 22 is coupled to a composite stereo signal amplifier 24 which is arranged to amplify, in a linear manner, signals in the range of approximately 10 Hz to 150 KHz so as to produce first and second substantially identical but 180° out of phase (i.e., push-pull) amplified composite signals for direct application to various circuit elements within stereo decoder chip 22. Stereo decoder 22 further comprises a voltage controlled oscillator 26 arranged to operate at a frequency of 228 KHz, an even harmonic of both the 19 KHz pilot signal and the 38 KHz stereo difference signal subcarrier. The frequency of operation of oscillator 26 is determined primarily by means of a parallel resonant tank circuit comprising an inductor 82 and a capacitor 80 located external to the decoder chip 22 and connected thereto via terminals $T_2$ and $T_3$. The 228 KHz output waveform produced by oscillator 26 is shaped, as will be explained below in connection with FIG. 6, to provide a substantially symmetrical square wave output. The output of oscillator 26 is maintained in predetermined timed relationship with respect to the received 19 KHz pilot waveform by means of an automatic frequency and phase control (AFPC) loop. The AFPC loop comprises frequency divider means coupled to the output of oscillator 26 for producing a waveform having a frequency (nominally 19 KHz) which is an integral submultiple (one-twelfth) of the oscillator output frequency and is in predetermined time relationship with respect to the oscillator output waveform. The desired frequency division and time relationship are obtained by means of a first frequency divider 28 coupled to oscillator 26 and arranged to divide by two (nominal output of 114 KHz), a second frequency divider 30 coupled to divider 28 and arranged to divide by three (nominal output of 38 KHz), a phase selector 32 coupled to divider 30 and arranged to provide a predetermined one of opposite phases of the nominal 38 KHz waveform to a third frequency divider 34. Frequency divider 34 is arranged to divide the output of phase selector 32 by a factor of two to produce a nominal 19 KHz output waveform in push-pull fashion to a balanced synchronous AFPC detector 36. AFPC detector 36 is also provided with the push-pull composite signal output, including received 19 KHz pilot signal, provided by composite signal amplifier 24. A differential direct voltage representative of the phase difference between the received pilot signal and the nominal 19 KHz waveform derived from the output of oscillator 26 is developed across a filter capacitor 38 mounted external to chip 22 and coupled to AFPC detector 36 by means of terminals $T_4$ and $T_5$. The differential direct voltage developed across capacitor 38 is coupled to oscillator 26 in balanced fashion to correct the operating frequency and phase thereof. Specifically, the AFPC loop maintains the 19 KHz output of divider 34 substantially in a specific quadrature phase relation with respect to the received 19 KHz pilot signal.

Frequency divider 30 is arranged to generate the required 38 KHz subcarrier waveform for detection of the difference (L−R) audio signal from the received sidebands of the 38 KHz suppressed subcarrier signal. Those sidebands, along with the remainder of the composite signal produced at the output of composite signal amplifier 24, are supplied in push-pull fashion to a balanced synchronous subcarrier detector 40. The locally generated 38 KHz subcarrier signal provided by divider 30, which is maintained at proper phase and frequency by operation of the above-described AFPC loop, is coupled in push-pull fashion from the output of frequency divider 30 to subcarrier detector 40. Detector 40 is arranged as a "doubly balanced" synchronous detector, as will be pointed out below, and therefore produces push-pull outputs including (L−R) and −(L−R), the desired difference audio signals. The positive and negative difference audio signals are supplied, respectively, to matrix amplifiers 42 and 44 to which the sum (L+R) audio signals, as well as the remainder of the composite signal output of amplifier 24, are also supplied.

Matrix amplifiers 44 and 42 produce at their respective output terminals, $T_{10}$ and $T_{11}$, uncompensated left (L) and right (R) audio signals. The uncompensated left and right audio signals are coupled to standard de-emphasis networks 46 and 48 and the resulting compensated signals are supplied to respective audio amplifiers 50 and 52. The outputs of amplifiers 50 and 52 are coupled to loudspeakers 54 and 56, respectively. The de-emphasis networks 46, 48 further serve to remove the ultrasonic remnants of the balanced detection process as well as the pilot signal and modulation components of the 38 KHz subcarrier which are present in the composite signal outputs of amplifier 24.

Means are also provided within stereo decoder 22 for producing an indication of the presence, in the signals received by FM tuner-detector 20, of stereophonic program material. Specifically, means are provided for sensing the presence of the pilot signal which is present during a stereophonic broadcast, but not during a monophonic broadcast. The stereophonic presence detector comprises a fourth frequency divider 58 coupled to a second output of phase selector 32 at which there is provided a 38 KHz waveform 180° out of phase with the waveform coupled to frequency divider 34. The second output waveform of phase selector 32 is divided by two in frequency divider 58 to produce a 19 KHz waveform in a predetermined substantially quadrature phase relation with respect to the output of frequency divider 34 and substantially in phase with the received pilot signal waveform. The pilot signal waveform, along with the remainder of the output of composite signal amplifier 24, is coupled in push-pull fashion to a balanced synchronous pilot presence detector 60. The output of frequency divider 58 is also coupled in push-pull fashion to detector 60 such that differential direct voltage outputs are produced across capacitors **62*a*, 62*b*** which are coupled, respectively, from terminals $T_7$ and $T_8$ to ground.

The voltage across capacitor **62*b* is amplified by means associated with detector 60 so as to produce, at output terminal $T_9$, a direct voltage referenced to ground potential indicative of the presence of pilot signal in the received program material. A stereo indicator 64** typically consisting of an incandescent lamp and a switching transistor is coupled to terminal $T_9$ and provides visual indication of stereo reception.

Stereo decoder 22 further comprises means coupled to synchronous subcarrier detector 40 for disabling operation of the subcarrier detection circuits when the prolonged absence of substantial pilot signal indicates that non-stereophonic (monophonic) program material is being received or when the signal to noise ratio of the received signal is judged too poor for satisfactory stereo reproduction. The disabling means comprises a logical OR circuit 66 having one input coupled to the terminal $T_8$ associated with pilot presence detector 60 and a second input coupled to a balanced synchronous noise detector 68, the function of which will be described below.

With regard to the output of pilot presence detector 60, OR circuit 66 provides an output signal to a stereo disabling or stereo killer circuit 70 which is coupled in turn to synchronous subcarrier detector 40 to disable detector 40 either in the absence of acceptable pilot signal or where the detected composite signal does not have adequate signal-to-noise ratio for acceptale stereophonic reproduction. When subcarrier detector 40 is disabled, monophonic (L+R) information only is supplied to matrix amplifiers 42 and 44. As will be pointed out below in connection with FIG. 8, where it is desired to provide an indication of stereo reproduction (rather than stereo reception as described above), stereo indicator 64 is coupled to the output of OR circuit 66 rather than directly to detector 60. Stereo disabling circuit 70 is associated with time delay means comprising a capacitor 72 coupled between terminal $T_{13}$ and ground and an associated resistor (not shown) which may, for example, be incorporated in the integrated circuit chip 22. The resistor and capacitor 72 are arranged with a time constant sufficiently great to require continuous presence of a pilot signal indication at the output of detector 60 for a protracted period (e.g., one second) before enabling subcarrier detector 40.

The balanced synchronous noise detector 68 is supplied with push-pull composite signal outputs from composite signal amplifier 24 and with push-pull square wave outputs having a fundamental frequency of 114 KHz from frequency divide 28. A capacitor 76 is coupled from terminal $T_{14}$ to ground, terminal $T_{14}$ being coupled to one of a pair of push-pull outputs of noise detector 66 to develop a voltage representative of noise components in the composite signal at frequencies higher than the highest signal component. It has been found to be convenient to detect such above-band noise at a frequency in the neighborhood of 100 KHz. The particular frequency of 114 KHz is chosen here for convenience with respect to its derivation from voltage controlled oscillator 26 which is constrained to operate at a frequency which is a harmonic of both the 19 KHz pilot signal frequency and the 38 KHz subcarrier frequency. The detected above-band noise is compared to a permissible reference signal-to-noise level by means (see FIG. 8 below) associated with noise detector 68 which provide a disabling signal to OR circuit 66 when the detected signal-to-noise ratio is below the permitted threshold or reference level. As noted above, stereo indicator 64 may be coupled to the output of OR circuit 66 such that the stereo indicator light will be extinguished whenever the stereo disabling circuit 70 operates to disable subcarrier detector 40.

In the block diagram of FIG. 1, additional terminals are associated with decoder chip 22 for connection to external components. For example, a ground connection is shown at terminal $T_6$ while a B+ (external voltage supply) connection is shown at terminal $T_{12}$. Terminals $T_{12}$ and $T_6$ are connected by means of numerous conductors within chip 22 (not shown) to various components within the illustrated functional blocks. Such connections will be shown in detail in subsequent figures of the drawing.

External capacitors **78*a* and 78*b* are coupled between ground and terminals T15 and T16, respectively, associated with composite signal amplifier 24. As will appear below in connection with FIG. 5, capacitors 78*a* and 78*b* serve a signal bypassing function in the biasing circuits associated with amplifier 24**.

Figure 2:
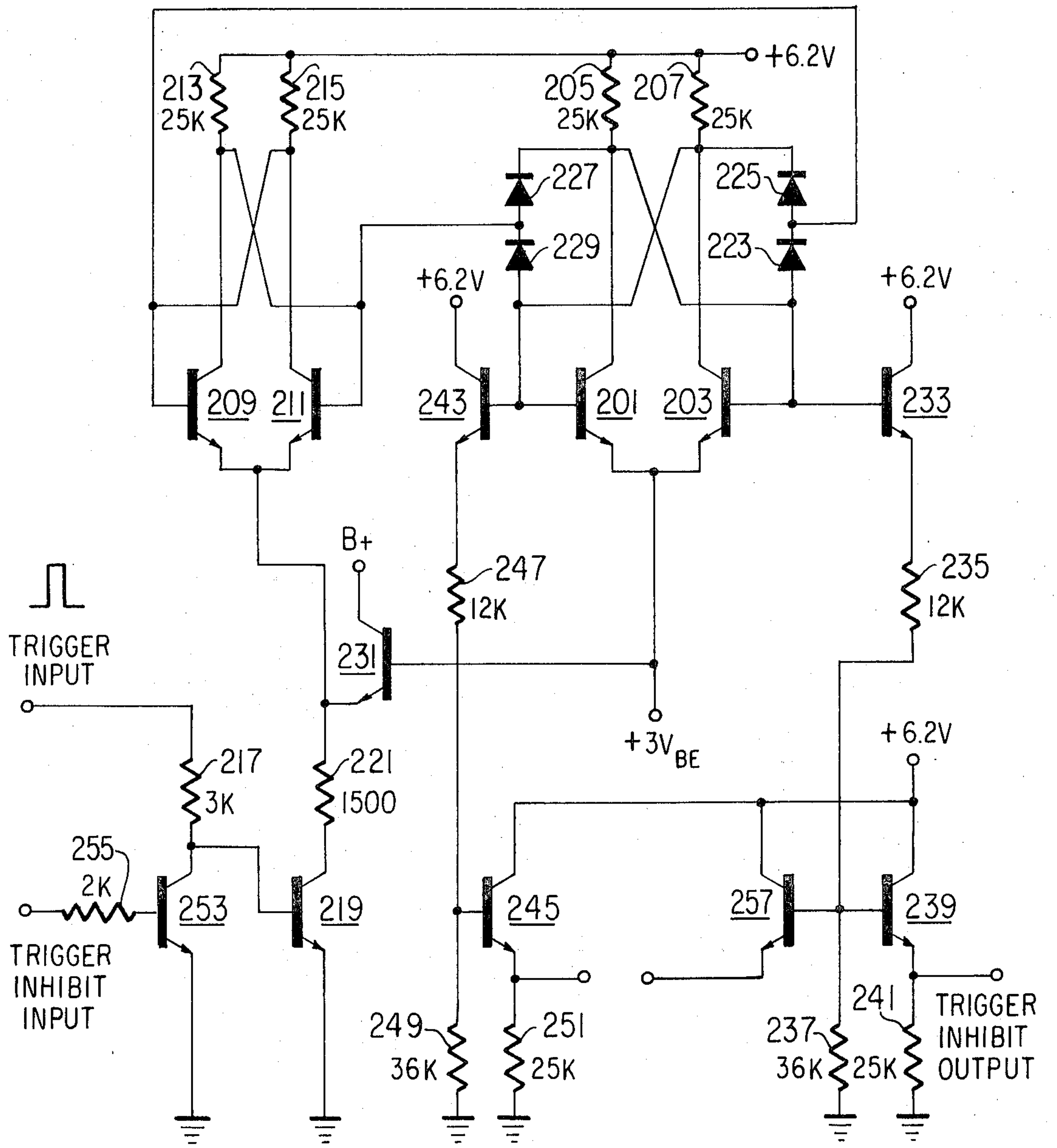
FIG. 2 is a schematic circuit diagram of a bistable counter module including typical logic gating circuits suitable for construction in integrated circuit form for use as a frequency divider in connection with the system shown in FIG. 1.

Referring to FIG. 2 of the drawing, a counter module, including input and output circuits, suitable for use in connection with the frequency dividers 28, 30, 58, 34 of FIG. 1 is illustrated. As shown in FIG. 1, all elements of the frequency dividers 28–34 are internal to decoder chip 22. Therefore, all elements or components shown in FIG. 2 are capable of being constructed in integrated form on a single chip.

In the frequency divider or counter module, transistors 201 and 203 together with collector resistors 205 and 207 form a bistable or flip-flop circuit by virtue of the connection of the collector electrode of transistor 203 to the base electrode of transistor 201, the connection of the collector electrode of transistor 201 to the base electrode of transistor 203, the common connection of the emitter electrodes of transistors 201 and 203 to a source of biasing voltage (+3 $V_{BE}$, i.e., three times the conduction base-emitter voltage drop of an NPN transistor on chip 22) and the common connection of collector resistors 205 and 207 to a source of operating voltage (e.g., +6.2 volts). Biasing and supply voltages associated with the counter module are stated herein with respect to a reference level which is ground in the illustrated circuits.

Transistors 209 and 211 together with collector load resistors 213 and 215 form a second or commutating flip-flop similar to that described above with the exception that the emitter electrodes of transistors 209 and 211 are coupled in common to a triggering circuit comprising a source of trigger pulses (e.g., voltage controlled oscillator 26 of FIG. 1) coupled via a resistor 217 to the base electrode of a switching transistor 219. The emitter electrode of transistor 219 is connected to a reference potential such as ground while the collector electrode of transistor 219 is coupled via a current limiting resistor 221 to the common connection of the emitter electrodes of transistors 209 and 211.

In the flip-flop comprising transistors 201 and 203, first and second series connected gating diodes 223 and 225 are connected between the base and collector electrodes of transistor 203 and are poled in the same direction as the collector-base diode of transistor 203. Similarly, third and fourth series connected gating diodes 227 and 229 are connected between the base and collector electrodes of transistor 201. The junction between diodes 223 and 225 is directly connected to the junction of the collector electrode of transistor 211 and the base electrode of transistor 209. Similarly, the junction between diodes 227 and 229 is directly connected to the junction of the collector electrode of transistor 209 and the base electrode of transistor 211. A clamp transistor 231 is also provided having a base electrode coupled to the common connection of the emitters of transistor 201, 203, a collector electrode coupled to B+ and an emitter electrode coupled to the common connection of the emitters of transistors 209, 211.

In operation, each time a trigger pulse is applied to the base electrode of transistor 219, one or the other of transistors 209 and 211, as will be explained below, is driven into conduction and a corresponding one of transistors 201 and 203 is driven into conduction to change the state of the latter flip-flop. The transistors 209, 211 in the commutating flip-flop then both return to their off condition to await the next trigger pulse. On the occurrence of the next trigger pulse, the one of transistors 209, 211 which remained off during the preceding trigger pulse conducts, again changing the state of the flip-flop 201, 203.

Specifically, assume that the transistor 203 is conducting while the transistor 201 is non-conducting. With the biasing illustrated in FIG. 2, the base electrode of conducting transistor 203 will be at +4 $V_{BE}$ (for example, approximately +2.8 volts) as will the collector electrode of non-conducting transistor 201. At the same time, the collector electrode of conducting transistor 203 will be at substantially +3 $V_{BE}$ plus the collector-emitter saturation voltage of transistor 203 (for example, a total of +2.2 volts) as will the base electrode of non-conducting transistor 201. It can therefore be seen that the output voltages at the collector electrodes of transistors 201 and 203 will vary between substantially +3 $V_{BE}$ and +4 $V_{BE}$ (the relatively small collector-emitter saturation voltage of approximately 0.1 volts will hereafter be neglected for simplification). Considering the commutating flip-flop 209, 211, with no trigger input applied to transistor 219, neither transistor 209 nor transistor 211 conducts. Since the collector electrode of transistor 201, as set forth above, is at +4 $V_{BE}$ and collector resistor 213 (associated with transistor 209) is coupled by means of diode 227 between that voltage and the operating voltage source (+6.2 volts) which is greater than 5 $V_{BE}$, diode 227 is forward biased to conduction so that the base electrode of transistor 211 is at a voltage of +5 $V_{BE}$. By similar reasoning, it can be seen that the base electrode of transistor 209, by reason of its connection to the base electrode of transistor 201 via diode 225, is at a voltage of +4 $V_{BE}$. When transistor 219 is turned on (driven to saturation) by a positive trigger pulse, the collector current of transistor 219 is steered into transistor 211 since the base electrode of transistor 211 is at a more positive voltage (+$V_{BE}$ higher) as compared to the base electrode of transistor 209. Transistor 211 is therefore driven to saturation conduction so that its collector electrode tends to drop to a voltage substantially equal to the sum of the saturation collector-emitter voltages of transistors 211 and 219. However, clamp transistor 231 conducts to maintain its emitter at substantially +2 $V_{BE}$. The collector of transistor 211 therefore is essentially also at +2 $V_{BE}$, which voltage is coupled from the collector electrode of transistor 211 to the junction of diodes 225 and 223. The base electrode of transistor 203 which, since that transistor was conducting, has been at a voltage of +4 $V_{BE}$, now decreases to the sum of the above-described collector voltage of transistor 211 (+2 $V_{BE}$) and the voltage across diode 223 ($V_{BE}$). Since the emitter electrode of transistor 203 is at +3 $V_{BE}$, transistor 203 ceases conduction. As the voltage of the collector electrode of transistor 203 increases, transistor 201 is driven to conduction and transition of the flip-flop 201, 203 is completed.

Upon the occurrence of the next trigger pulse, transistor 209 will conduct, causing the flip-flop 201, 203 to again change state. The particular output voltage levels corresponding to the two states of flip-flop 201, 203 have been selected to facilitate subsequent combination of outputs from several such flip-flops in transistor logic circuits as well as to permit use of such outputs after level translation, to operate synchronous detectors employing transistors which have their emitters substantially at ground potential. In the case of the synchronous detectors, it is advantageous to translate the logic voltage levels of substantially +4 $V_{BE}$ and +3 $V_{BE}$ to voltage levels closer to ground. Specifically, in the case of the collector voltage output of transistor 201, translation is accomplished by means of an emitter follower transistor 233 having a voltage divider comprising resistors 235 and 237 coupled as an emitter load and a further emitter follower transistor 239 coupled to the junction of resistors 235, 237 and having an emitter resistor 241 coupled to ground. Resistors 235 and 237 are arranged to provide at their junction a voltage output which is three-fourths the voltage input across resistors 235, 237. Each of emitter follower transistors 233 and 239 produces a one $V_{BE}$ drop in the logic voltage output. The total result is that the logic voltages provided across resistor 241 are, for the two logic states, +½ $V_{BE}$ and +1¼ $V_{BE}$ above ground. These logic voltage levels are particularly suitable for switching transistors wherein the emitters are substantially at ground potential.

A similar voltage translation arrangement comprising first and second transistors 243 and 245, a voltage divider 247, 249 and an emitter load resistor 251 is associated with the output from the collector electrode of transistor 203. The two logic state levels provided at the emitters of transistors 233 and 243 are $+3V_{BE}$ and $+2V_{BE}$ and are suitable for application to the synchronous detectors which will will be explained below in connection with FIGS. 6 – 9.

It can be seen from considering the operation of the counter module illustrated in FIG. 2 that that counter may be utilized as a frequency divider such as frequency divider 28 described in connection with FIG. 1. Where the trigger input supplied to transistor 219 is a square wave having a fundamental frequency of 228 KHz as is provided by oscillator 26 in FIG. 1, the counter of FIG. 2 will provide complementary square wave outputs across resistors 241 and 249 at 114 KHz, as is required for frequency divider 28. Furthermore, by suitable interconnection a plurality of counters as shown in FIG. 2, the additional frequency division and selection functions ascribed to frequency dividers 30, 34, 58 and phase selector 32 of FIG. 1 may be provided.

Interconnection of two or more such counters advantageously is accomplished by circuit components performing logical AND and OR functions. For example, if it is desired to trigger the counter of FIG. 2 by means of either the illustrated trigger input supplied to the base of transistor 219 or by a second trigger input (such as the output of a second counter), an additional transistor having a base electrode coupled to an output of the second counter and collector and emitter electrodes directly connected to the corresponding electrodes of transistor 219 may be utilized to achieve such a logical OR function. Such an OR function would be achieved utilizing the positive logic convention (i.e., logical 1 defined by a greater voltage than a logical 0). In order to achieve a logical AND function utilizing a positive logic convention, it is convenient in the present case to apply the well-known technique of providing an OR function in a negative logic convention utilizing complements of the data and then inverting the output of the OR function.

In the illustrated counter, complemented logic outputs are derived from counter output transistors such as transistor 239 and the emitters of all output transistors for a particular negative OR function are coupled to a single resistor such as resistor 241. A suitable inverter comprises transistor 253 connected as shown.

In operation, if any of the complemented logic outputs across the resistor such as 241 is a logical 1 (1¼ $V_{BE}$), then a 1 will be supplied via resistor 255 to the base of the transistor 253 causing it to conduct. The trigger input to transistor 219 will be inhibited and the flip-flop 201, 203 will not change state in response to a trigger pulse. However, if the input to transistor 253 is a logical 0 ($V_{BE}/2$ as described above), the trigger input will be passed to transistor 219 to change the state of flip-flop 201, 203.

A plurality of outputs readily may be derived from either side of flip-flop 201, 203 by coupling, in parallel with transistor 239, additional transistors such as transistor 257 adapted for connection to a gating circuit of the type illustrated by transistor 253.

Figure 3:
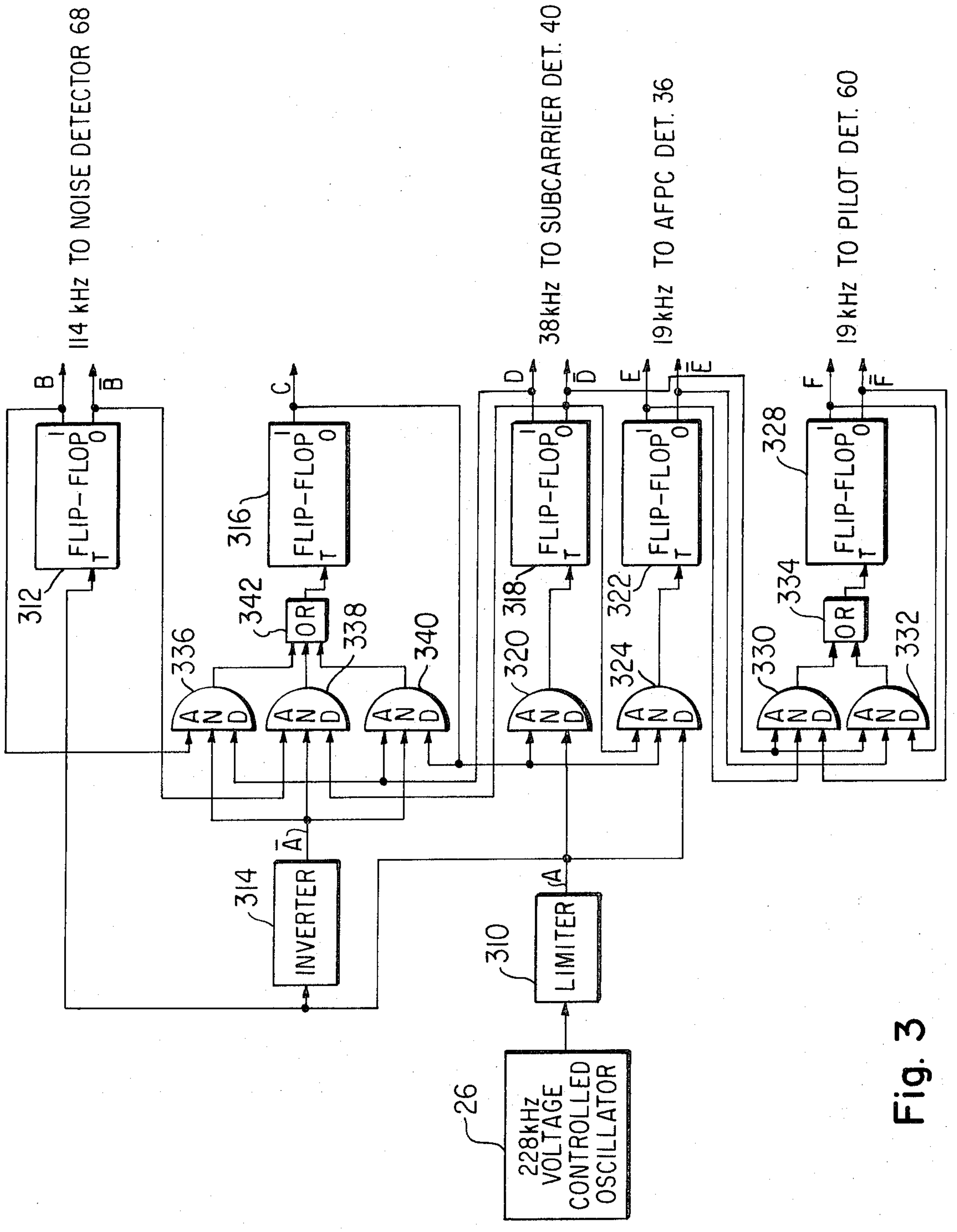
FIG. 3 illustrates, in block diagram form, the manner in which a plurality of counter modules of the type shown in FIG. 2 may be interconnected to produce the synchronous detection switching waveforms required in the system shown in FIG. 1.

Referring now to FIG. 3 of the drawing, a plurality of counters and interconnecting logic circuits are illustrated in block diagram form. Each of the counters may be identical to the counter described in connection with FIG. 2 above while the logic functions (AND and OR) may be performed in the manner and by the means described in connection with FIG. 2. A positive logic convention is assumed in the discussion which follows. For simplicity, the diagrams shown in FIG. 3 illustrate interconnections utilizing positive logic AND circuits. However, it should be remembered, as pointed out in connection with FIG. 2, that the AND function is particularly easily accomplished in the present environment by supplying the complement of a particular signal to a circuit arrangement such as resistor 255 and transistor 253 in connection with transistor 219.

Figure 4:
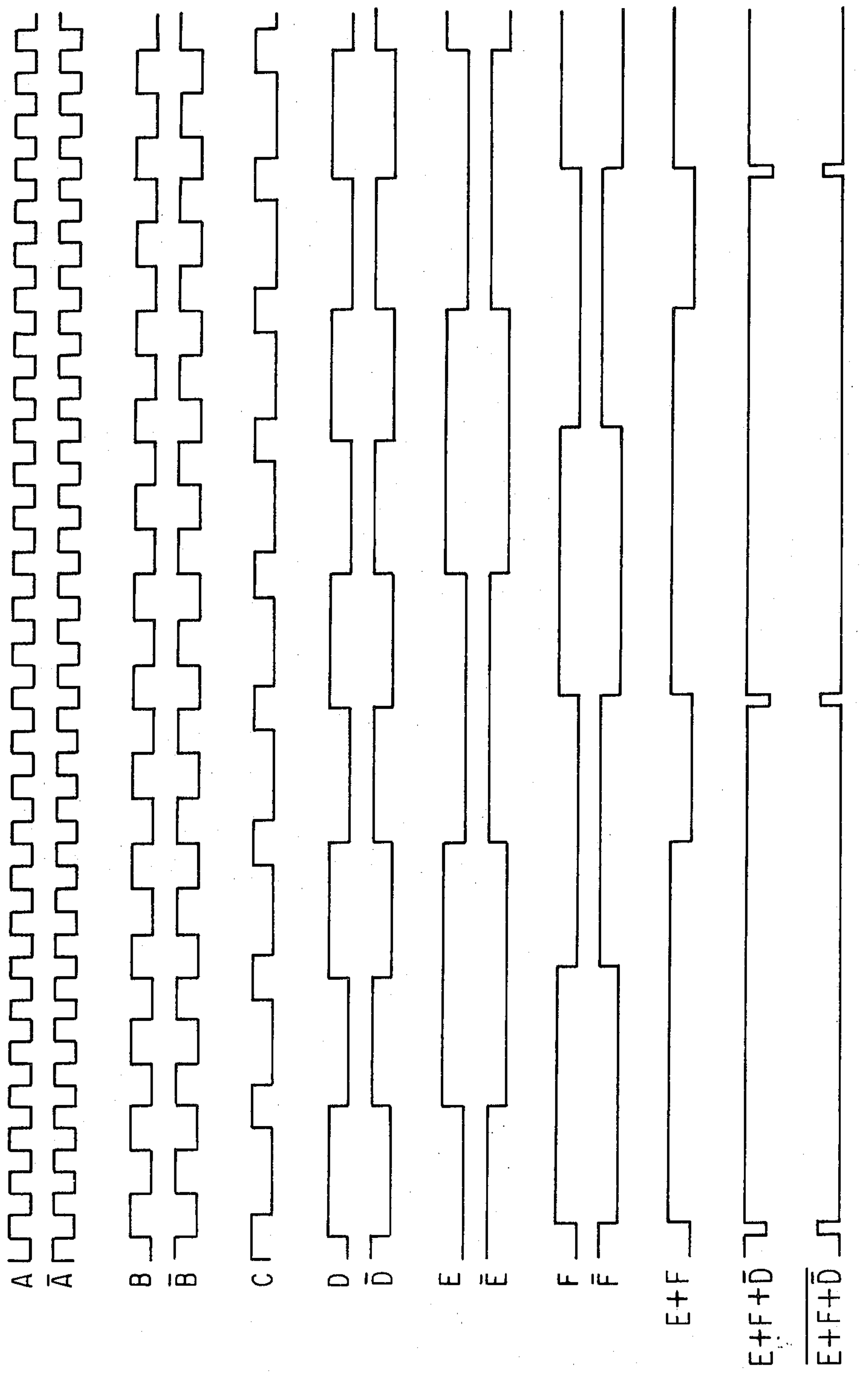
FIG. 4 is a series of waveform diagrams representative of switching waveforms produced by the apparatus shown in FIG. 3.

Referring to FIG. 3 in connection with FIG. 4, a 228 KHz voltage controlled oscillator 26 supplies a continuous substantially sinusoidal wave output to a limiter circuit 310, the output of which is a continuous square wave having a fundamental frequency of 228 KHz (waveform A, FIG. 4). The 228 KHz square wave A is supplied to the trigger input (T) of a first frequency dividing bistable circuit of flip-flop 312 which provides at its output terminals (0, 1) complementary 114 KHz square waves (waveforms B, $\overline{B}$, FIG. 4) having positive and negative-going level transitions coincident with positive-going level transitions of waveform A. The 228 KHz square wave output of limiter 310 is also supplied to an inverter circuit 314 which provides at its output a 228 KHz square wave (FIG. 4, waveform $\overline{A}$) which is complementary to or inverted with respect to the output of limiter 310. That is, each negative-going level transition of waveform $\overline{A}$ substantially coincides with a positive-going level transition of waveform A and vice versa.

A second flip-flop 316, arranged to change state in synchronism with only selected ones of the positive-going level transitions of waveform $\overline{A}$ provides at its output terminal (1) an asymmetrical pulse waveform (FIG. 4, waveform C). The positive-going and negative-going level transitions of waveform C occur substantially simultaneously with selected positive-going transitions of waveform $\overline{A}$. The manner in which waveform C is developed will be discussed below.

A third flip-flop 318 arranged to provide complementary square wave outputs having a 38 KHz fundamental frequency is triggered at its input terminal (T) upon the simultaneous occurrence of a positive-going transition in waveform A and a "high" (1) condition of waveform C. Triggering of flip-flop 318 is accomplished by coupling the 228 KHz output of limiter 310 (waveform A) and the asymmetrical output of flip-flop 316 (waveform C) to a logical AND circuit 320. The output of AND circuit 320 is coupled to the trigger input (T) of flip-flop 318 to produce at the output terminals (0, 1) of flip-flop 318 complementary square waves (waveforms D, D̄) having a fundamental frequency of 38 KHz. Waveforms D, D̄ produced at the output of flip-flop 318 are suitable for application to synchronous subcarrier detector 40 of FIG. 1. The combination of flip-flops 312, 316 and 318 may be considered to be the equivalent of frequency dividers 28 and 30 of FIG. 1 and serves to frequency divide the 228 KHz output of limiter 310 (waveform A) by a factor of six. It should be noted that each level transition of waveforms D and D̄ occurs in synchronism with a positive-going level transition of the 228 KHz waveform A.

A fourth flip-flop 322 arranged to provide complementary square wave outputs (waveforms E, Ē) having a fundamental frequency of 19 KHz is also provided. Triggering of flip-flop 322 is accomplished by coupling the 228 KHz output of limiter 310 (waveform A), the asymmetrical output of flip-flop 316 (waveform C) and one of the 38 KHz outputs of flip-flop 318 (waveform D̄) to a logical AND circuit 324. The output of AND circuit 324 is connected to the trigger (T) input of flip-flop 322 to produce the 19 KHz waveforms required for operation of AFPC detector 36 of FIG. 1. It should be noted that each level transition of the waveforms E, Ē occurs in timed relation with a positive-going level transition of waveform A as was the case for the 38 KHz waveforms D, D̄. Level transitions of the output of flip-flop 322 therefore occur substantially simultaneously with transitions of the output of flip-flop 318. It should also be noted that the positive-going level transitions of waveform E coincide with negative-going transitions of waveform D. This timing relationship, which is constantly maintained by virtue of the fact that flip-flops 318 and 322 are triggered in parallel by waveform A, insures accurate synchronous detection of the stereophonic difference signal information, thereby minimizing crosstalk as will appear below in connection with the discussion of FIG. 7. A fifth flip-flop 328 arranged to provide complementary square wave outputs (waveforms F, F̄) having a fundamental frequency of 19 KHz but substantially in quadrature relationship with respect to waveforms E, Ē, is also provided. Triggering of flip-flip 328 is accomplished by coupling one of the 38 KHz outputs of flip-flop 318 (waveform D̄), one of the 19 KHz outputs of flip-flop 322 (waveform E) and one of the 19 KHz outputs of flip-flop 328 (waveform F̄) to a logical AND circuit 330. Furthermore, the other of the outputs of flip-flop 318 (waveform D), the other of the outputs of flip-flop 322 (waveform Ē) and the other of the outputs of flip-flop 328 (waveform F) are coupled to a further logical AND circuit 322. The outputs of AND circuits 330, 322 are combined in a logical OR circuit 334 and the output of OR circuit 334 is, in turn, coupled to the trigger input (T) of flip-flop 328. Whereas each of flip-flops 312, 316, 318 and 322 is triggered by one of the 228 KHz waveforms A, Ā, flip-flop 328 is supplied only with trigger information from others of the associated flip-flops. The waveforms F, F̄ therefore are delayed slightly with respect to the basic timing waveforms A, Ā. This delay does not alter the basic operation of the pilot pressure detector 60 in which waveforms F, F̄ are utilized except to the extent that a slightly reduced output voltage is obtained from detector 60. However, the delay is utilized to advantage in connection with the operation of a pulse stretching circuit as will be explained below in connection with FIG. 8.

The manner in which the asymmetrical output (waveform C) of flip-flop 316 is produced will now be explained. Triggering of flip-flop 316 is accomplished by coupling the 228 KHz output of inverter 314 (waveform Ā), the 114 KHz output of flip-flop 312 (waveform B) and the 38 KHz output of flip-flop 318 (waveform D) to a logical AND circuit 336. Furthermore, the 228 KHz output of inverter 314 (waveform Ā), the other 114 KHz output of flip-flop 312 (waveform B̄) and the other 38 KHz output of flip-flop 318 (waveform D̄) are coupled to a logical AND circuit 338. Still further, the 228 KHz output of inverter 314 (waveform Ā), the first-mentioned 38 KHz output of flip-flop 318 (waveform D) and the output of flip-flop 316 (waveform C) are coupled to a logical AND circuit 340. The outputs of AND circuits 336, 338, 340 are combined in a logical OR circuit 342, the output of which, in turn, is connected to the trigger (T) input of flip-flop 316. Since each of AND circuits 336, 338, 340 is supplied with the 228 KHz trigger waveform Ā, and since, as noted above in connection with FIG. 2, the flip-flop 316 (as well as the other flip-flops shown) changes state, if at all, only on application of a positive-going trigger pulse, it is apparent that flip-flop 316 will change state upon the occurence of selected ones of the positive-going transitions of waveform Ā. This is in contrast to the other flip-flops 312, 318, 322, 328 which change state substantially upon the occurrence of positive-going transitions of waveform A, which are displaced one-half the period of the 228 KHz waveform from the positive-going transitions of waveform Ā. A further characteristic of the output of flip-flop 316 is that the high (1) and low (0) portions thereof are of unequal duration (i.e., the waveform C is asymmetrical). Such an asymmetrical waveform is advantageous particularly in connection with the generation of the 38 KHz waveforms D, D̄, which require dividing the 228 KHz waveform A by a factor of six (a number which is not an integral power of two).

In the above-described frequency dividing system, it should be noted that the oscillator 26 is arranged to operate at an even harmonic of the 38 KHz subcarrier frequency and also at an even harmonic of the 19 KHz pilot frequency. Selection of the frequency of operation of oscillator 26 in this manner facilitate generation (or timing) of each of the leading and trailing edges of the generated 38 KHz switching waveform from a single polarity of the oscillator clock pulse output waveform. The average axis crossings of the 38 KHz switching waveform are therefore accurately controlled to provide, as will appear below, good separation of the detected stereophonically related audio signals.

Other timing relationships are possible, but the above-described system adds to the simplicity of the logic and frequency dividing circuits.

It is also possible to generate the required sets of complementary square wave outputs utilizing different logic functions than those employed in the apparatus shown in FIG. 3. For example, in connection with the generation of the output of flip-flop 316, AND circuit 340 may be supplied with the inputs Ā, C and B̄ rather than the inputs Ā, C and D shown in FIG. 3. The same waveforms as those shown in FIG. 4 will result in either case. Other modifications are also possible.

It should be noted that each of the flip-flops, upon initial turn-on of the system, may be in either logic state (1 or 0). In order to obtain the desired relative time relationships between the outputs of the several flip-flops, the logic circuits preceding such flip-flops are arranged to take into account the existence of these two possibilities. For example, flip-flop 316 initially may be in either state (1 or 0) when a trigger pulse is supplied via OR circuit 342. AND circuit 340 is provided so that the positive going and negative going transitions of waveform C as illustrated in FIG. 4 are not transposed but occur in the illustrated relationship with respect to the other waveforms. The logic circuits associated with the remaining flip-flops are also arranged to provide the waveforms illustrated in FIG. 4.

The manner in which the square wave outputs B, $\bar{B}$, D, $\bar{D}$, E, $\bar{E}$ and F, $\bar{F}$ are utilized in the decoder chip 22 will be explained below in connection with FIGS. 6, 7, 8 and 9.

Figure 5:
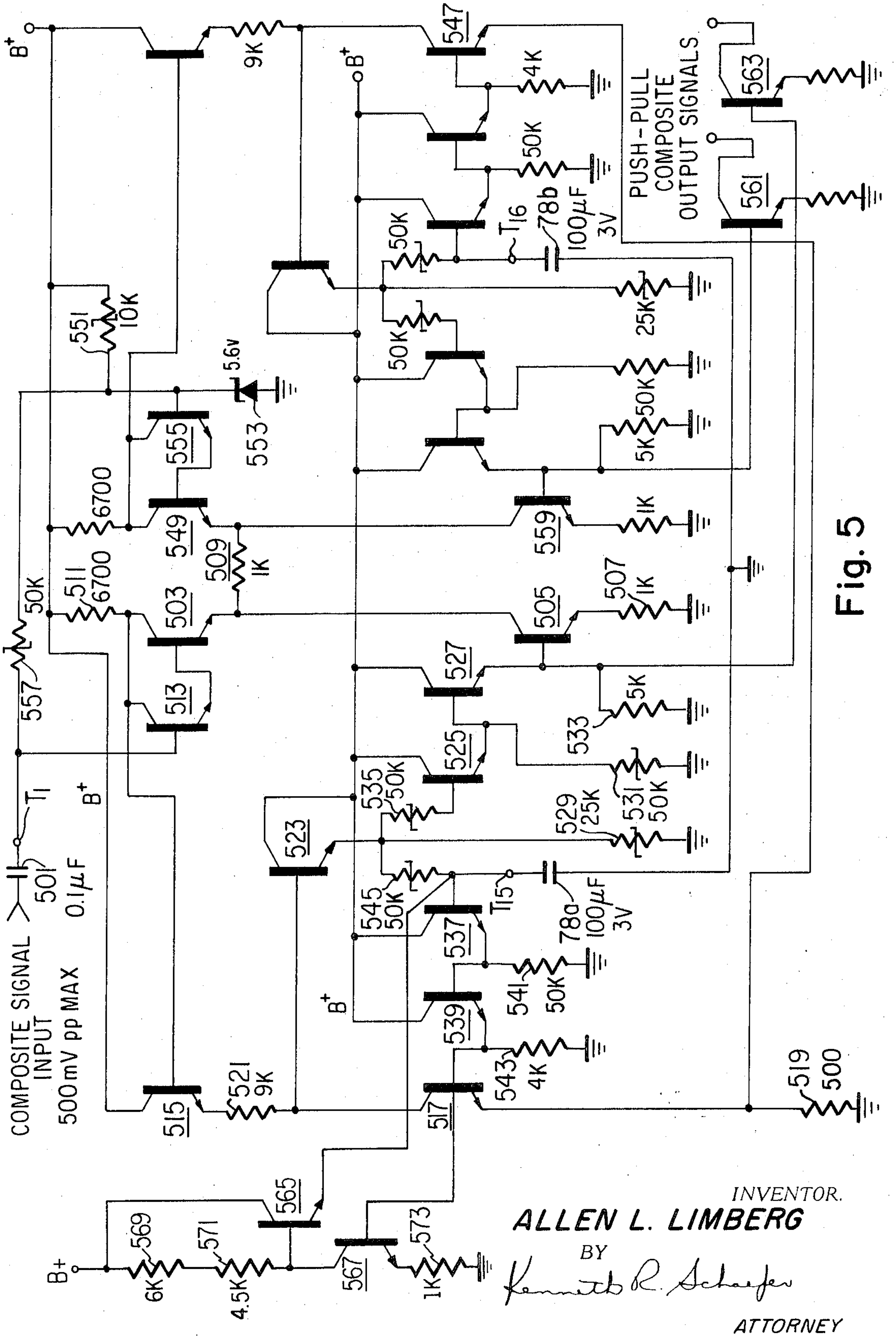
FIG. 5 is a schematic circuit diagram of a composite stereo signal amplifier adapted for construction in integrated circuit form for use in connection with the system shown in FIG. 1.

Referring to FIG. 5 of the drawing, a schematic diagram of a composite stereo signal amplifier arranged to provide balanced push-pull composite stereo signals in the manner described in connection with amplifier 24 of FIG. 1 is shown. The illustrated composite stereo signal amplifier is particularly adapted for construction on the integrated circuit chip 22 as shown in FIG. 1.

In FIG. 5, the composite signal produced by an FM tuner-detector is coupled by means of a capacitor 501 external to chip 22 and terminal $T_1$ of chip 22 to a balanced differential amplifier configuration. Each half of the differential amplifier configuration may be characterized as an emitter follower wherein the emitter load impedance includes a shunt regulator. Specifically, one half of the differential amplifier configuration comprises an emitter follower transistor 503 having a signal variant emitter load impedance comprising the collector-emitter path of a shunt regulator transistor 505, the emitter of transistor 505 being coupled to ground by means of a resistor 507. The collector electrode of transistor 505 is directly connected to the emitter electrode of emitter follower transistor 503 and to one terminal of a differential output load resistor 509. The collector electrode of transistor 503 is coupled to a source of operating voltage (B+ such as +8.5 volts) by means of a resistor 511.

Composite input signals are coupled from terminal $T_1$ to the base electrode of emitter follower transistor 503 by means of a Darlington-connected emitter follower transistor 513. The collector current of emitter follower transistor 503 is maintained substantially constant as the composite input signal varies by virtue of a feedback system coupled from the collector electrode of emitter follower transistor 503 to the base electrode of variable impedance transistor 505. The feedback system comprises an emitter follower transistor 515 and a direct voltage translation network comprising a current source transistor 517 having its emitter electrode coupled to ground by means of a resistor 519 and its collector electrode coupled to the emitter electrode of transistor 515 via a dropping resistor 521. The collector electrode of current source resistor 517 is coupled to the base electrode of variable impedance transistor 505 by a series of cascaded emitter follower transistors 523, 525 and 527 which are provided with respective emitter load resistors 529, 531 and 533 returned to ground. A resistor 535 is coupled between the emitter of follower transistor 523 and the base of follower transistor 525.

Bias voltage is supplied to the base electrode of current source transistor 517 by means of emitter follower transistors 537 and 539 having associated emitter load resistors 541 and 543. Emitter follower transistor 537 is direct coupled to emitter follower transistor 523 in parallel with emitter follower transistor 525 by means of a resistor 545 equal to resistor 535. Alternating current signals are bypassed at the input of transistor 537 by means of a capacitor 78*a* coupled to terminal $T_{15}$ and mounted external to decoder chip 22 (see FIG. 1). Capacitor 78*a* is returned to ground.

The above-described configuration insures that the direct base bias voltage applied to current source transistor 517 and the direct base bias voltage applied to shunt regulator transistor 505 are equal. That is, each of transistors 505 and 517 is supplied with direct base bias voltage from the same source (the emitter of transistor 523) by means of components which are substantially identical. The bases of transistors 505 and 517 may be considered to be directly connected to each other so far as direct bias voltage is concerned. Note the emitter load resistor 507 of transistor 505 is twice as great as the emitter load resistor 519 of transistor 517. However, resistor 519 is also coupled to a corresponding current source transistor 547 associated with the other half of the illustrated differential amplifier and will therefore be supplied with twice the direct current supplied to resistor 507. The direct voltage drops across resistors 507 and 519 are therefore equal and the direct bias base-emitter voltages of transistors 505 and 517 will be substantially equal. Therefore, the direct quiescent (no signal) collector currents of transistors 505 and 517 will be substantially identical for identical transistor structures as in the integrated circuit case.

The second half of the illustrated differential amplifier is identical to the first half described above with the exception that the base electrode of the constant collector current emitter follower transistor 549 is not supplied with signals but is maintained at a substantially fixed direct voltage by means of a voltage divider comprising a resistor 551 and a zener diode 553 connected between a source of voltage (B+) and ground, the junction of resistor 551 and diode 553 being coupled by means of a Darlington-connected emitter follower transistor 555 to the base electrode of transistor 549. The base of transistor 513 in the half of the differential amplifier previously described is also coupled to the zener diode 553 by means of a resistor 557.

In the same manner as was described above in connection with transistors 505 and 517, the quiescent collector currents of transistors 547 and 559 are also substantially equal to each other and, by virtue of the differential connection via resistor 519, all four quiescent collector currents (517, 505, 547, 559) are substantially equal. Furthermore, all base bias voltages at similar points in the two halves of the amplifier are substantially equal (e.g., voltages at bases of transistors 517 and 547 are equal and voltages at bases of transistors 503 and 549 are equal). The amplifier therefore provides good common mode rejection of the direct bias voltages. Another consequence of the differential connection via resistor 519 is that the base bias voltage of a plurality of output transistors such as transistors 561 and 563 will all be equal. In the quiescent (not signal) condition, substantially zero current flows in resistor 509 which is coupled between the emitters of transistors 503 and 549. That is, these emitters are at substantially the same direct voltabe 2 $V_{BE}$ below the voltage across zener diode 553.

In operation, composite signals applied to terminal $T_1$ via capacitor 501 tend to modulate or vary the collector current of transistors 503 and 549 in a differential manner. However, the respective feedback circuits coupled from the collector electrodes of transistors 503 and 549 to the base electrodes of transistors 505 and 559 vary the impedances of transistors 505 and 559 in a manner to maintain the collector currents of transistors 503 and 549 substantially constant. For example, if the composite signal input increases positively, tending to increase conduction of transistor 503, the associated feedback circuit provides less positive signal to the base electrode of transistor 505 which increases the impedance (decreases conduction) of transistor 505. At the same time, the applied input signal tends to decrease conduction of transistor 549 (signal is coupled to the emitter electrode of transistor 549 via transistors 513, 503 and resistor 509). The feedback circuit of the second half of the amplifier causes the transistor 559 to increase conduction to maintain the collector current of transistor 549 substantially constant. Current is coupled from transistor 503 via resistor 509 to transistor 559. The decrease collector current of transistor 505 and the increased collector current of transistor 559 represent the amplified composite signal input. Amplified push-pull composite signal outputs are provided by coupling, for example, the base-emitter circuits of one or more transistors, such as transistors 561 and 563 in parallel with the base-emitter circuits of transistors 505 and 559 to provide current repeaters for coupling the output signals to, for example, detectors 36, 40, 60 and 68 in FIG. 1.

The composite signal amplifier 24 is arranged to provide linear amplification of signals in the range of 10 Hz to 150 KHz and to supply such amplified signals to a plurality of variable impedance loads via transistors 561 and 563 as will appear below.

In order to insure rapid turn-on of the amplifier 24 when power is applied to the receiver, means are provided for rapidly charging the relatively large filter capacitors 78*a* and 78*b*. The charging means for capacitor 78*a* comprises a transistor 565 having a collector electrode coupled to the main (B+) voltage supply, an emitter electrode connected to capacitor 78*a* at terminal $T_{15}$ and a base electrode coupled to a source of switching signals. The source of switching signals is arranged for switching transistor 565 to a conductive or low impedance condition at turn-on of the receiver and for switching transistor 565 to an off or high impedance condition after a predetermined time interval elapses. The signal source comprises a transistor 567 having a collector electrode coupled to the main (B+) voltage supply via series connected resistors 569 and 571, an emitter electrode coupled to ground via a resistor 573 and a base electrode coupled, for example, to the base electrode of transistor 517. The collector electrode of transistor 567 is directly coupled to the base electrode of transistor 565.

The charging means for capacitor 78*b* comprises two additional transistors and an emitter resistor (not shown) which are coupled in the same manner as transistors 565, 567 and resistor 573 to the B+ voltage supply. The base of the additional transistor corresponding to transistor 567 is coupled to the base of transistor 547 while the emitter of the additional transistor corresponding to transistor 565 is coupled to terminal $T_{16}$. The illustrated turn-on circuit associated with capacitor 78*a* will now be described. The similar circuit associated with capacitor 78*b* operates in the same manner.

In operation, when the main voltage supply (B+) of the receiver is energized, transistor 565 conducts substantially immediately, since B+ voltage is applied directly to its base electrode. Transistor 567 is in a high impedance state at this time. Capacitor 78*a* is charged rapidly via transistor 565 and operating bias is established on the base electrodes of transistors 537, 539, 517 and 567. As transistor 567 beings to conduct, the voltage at the base of transistor 565 decreases tending to turn transistor 565 off. When the capacitor 78*a* reaches a predetermined desired quiescent voltage, transistor 565 is shut off and remains in that condition until the receiver is again turned off and on again.

Figure 6:
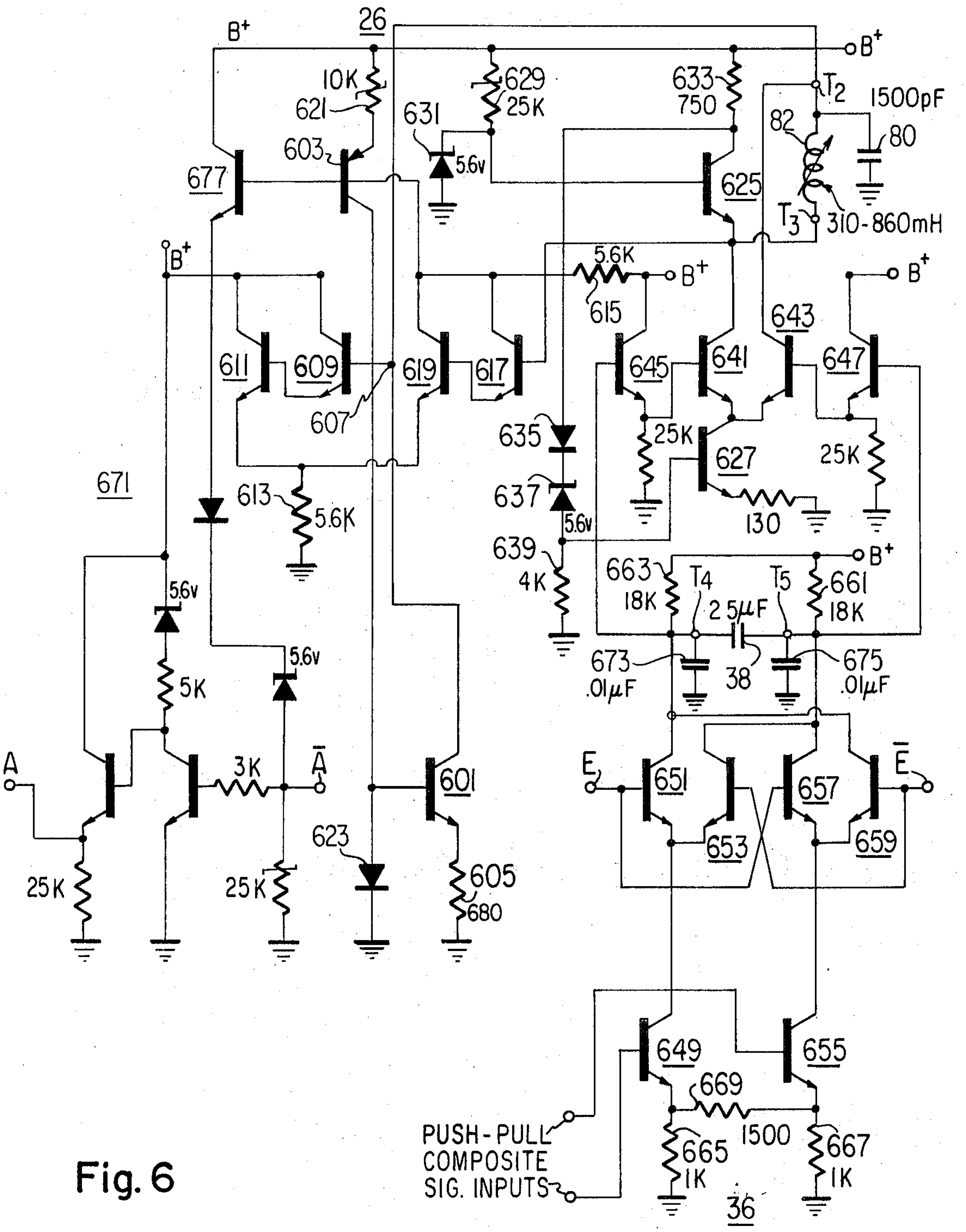
FIG. 6 is a schematic circuit diagram of a voltage controlled oscillator system including a balanced AFPC detector adapted for construction in integrated circuit form for use in connection with the system shown in FIG. 1.

Referring to FIG. 6 of the drawing, a controlled oscillator particularly adapted for fabrication using integrated circuit techniques and arranged to operate at a frequency of 228 KHz as indicated in the stereo decoder chip 22 of FIG. 1 is illustrated, In FIG. 6, elements which are also shown in FIG. 1 are designated by the reference numerals used in FIG. 1.

The controlled oscillator is of the type shown in U.S. Pat. application Ser. No. 862,705 now U.S. Pat. No. 3,636,475 entitled Oscillator With Variable Reactive Current Frequency Control filed Oct. 1, 1969 in the name of Steven Steckler and assigned to the same assignee as the present invention.

The controlled oscillator 26 is arranged to provide substantially square wave outputs (waveforms A, $\bar{A}$, of FIG. 4) having a fundamental frequency of 228 KHz and a predetermined time relationship to the 19 KHz pilot signal produced at the output of composite signal amplifier 24 to clock the operation of the frequency divider circuits illustrated in FIG. 3.

Oscillator 26 comprises an amplifier arrangement including a tuned reactive circuit coupled in a positive feedback path between the output and the input of the amplifier. The amplifier is arranged as a differential amplifier and comprises emitter coupled transistors 611 and 619 coupled to a common emitter resistor 613 which, in turn, is returned to ground. The tuned reactive circuit comprising inductor 82 and capacitor 80 is coupled between a point of reference potential (ground) and a common input-output terminal 607 of the differential amplifier, the common terminal being the base electrode of a transistor 609 arranged in a Darlington configuration with transistor 611. Transistor 619 is also associated with a transistor 617 in a second similar Darlington configuration. The collector electrodes of transistors 609 and 611 are directly connected to the operating voltage supply (B+) while the collector electrodes of transistors 617 and 619 are coupled to B+ via a load resistor 615. The joined collector electrodes of transistors 617 and 619 are coupled to the input-output terminal 607 via a direct voltage translating arrangement comprising a PNP transistor 603 having an emitter electrode coupled to B+ via a resistor 621, a base electrode coupled to resistor 615 and a collector electrode coupled to the junction of the anode of a diode 623 and the base electrode of a transistor 601. The cathode of diode 623 is returned to ground. A resistor 605 is connected between the emitter electrode of transistor 601 and ground while the collector electrode of transistor 601 is directly connected to the base electrode of transistor 609 (i.e., to the input output-terminal 607).

As noted in connection with FIG. 1 above, inductor 82 and capacitor 80 are mounted external to the integrated circuit chip 22 and are coupled to chip 22 via terminals $T_2$ and $T_3$. The base electrode of transistor 617 is coupled to terminal $T_3$, a point at which the direct voltage is substantially equal to that at terminal $T_2$, the latter terminal being connected to the base electrode of transistor 609. Output signals developed across resistor 615 are coupled via an emitter follower transistor 677 and appropriate voltage translation and inversion means 671 to output terminals A and $\bar{A}$.

A current sampling arrangement is associated with the resonant circuit comprising inductor 82 and capacitor 80 and comprises a constant current emitter follower transistor 625 coupled to a shunt regulator or variable load transistor 627. The base electrode of transistor 625 is biased at a substantially fixed voltage by means of a reference voltage supply comprising the series combination of a resistor 629 and a zener diode 631 coupled across the B+ voltage supply. Feedback to accomplish the shunt regulation of the current in the emitter follower transistor 625 is provided from the collector electrode of transistor 625 to the base electrode of transistor 627 by means of a direct voltage translating network comprising a forward biased diode 635, a zener diode 637 and a resistor 639 returned to ground. The emitter electrode of transistor 625 is directly connected to terminal $T_3$ associated with inductor 82. The collector electrode of transistor 627 is directly coupled to terminal $T_3$ via the emitter-collector current path of a controllable conduction transistor 641. Transistor 641, along with a similarly functioning transistor 643 and transistor 627 form a current splitter arrangement for providing a controllable reactive current in parallel with inductor 82 as is explained in detail in a co-pending U.S. Patent Application Ser. No. 826,759, now U.S. Pat. No. 3,641,448, entitled "Transistor Signal Translating Stage," filed Oct. 1, 1969 in the name of Steven Steckler and assigned to the same assignee as the present invention. Differential direct control voltages for varying the reactive current supplied in parallel with inductor 82 are provided to transistors 641 and 643 via emitter follower transistors 645 and 647 from a balanced, synchronous pilot signal AFPC detector 36. Detector 36 comprises a first differential amplifier detector having a first composite signal current source transistor 649 coupled to one of the push-pull outputs of the composite signal amplifier 24 shown in detail in FIG. 5. For example, transistor 649 corresponds to transistor 561 in FIG. 5. The first differential amplifier detector of FIG. 6 further comprises a pair of switching transistors 651 and 653 having emitter electrodes connected in common to the collector electrode of current source transistor 649, collector electrodes connected to respective ones of output terminals $T_4$ and $T_5$ and base electrodes connected to respective ones of the complementary 19 KHz square wave outputs (E, $\bar{E}$) of flip-flop 322 of FIG. 3.

Detector 36 further comprises a second differential amplifier detector comprising a second composite signal current source transistor 655 (corresponding to transistor 563 in FIG. 5) having a collector electrode coupled to the emitter electrodes of a pair of switching transistors 657, 659. The base electrode of transistor 655 is coupled to the opposite one, as compared to transistor 649, of the push-pull outputs of the composite signal amplifier 24 of FIG. 5. The base electrodes of transistors 657 and 659 are coupled, respectively to the complementary square wave outputs E, $\bar{E}$ of flip-flop 322 of FIG. 3. The collector electrodes of transistors 657 and 659 are connected to output terminals $T_5$ $T_4$, respectively. That is, the collector electrodes of transistors 651, 653, 657 and 659 are cross-connected. The cross-connected collector electrodes of transistors 653 and 657 are coupled to a source of operating voltage (B×) by means of a collector load resistor 661 and, similarly, the collector electrodes of transistors 651 and 659 are coupled to the source of operating voltage (B+) by means of a collector load resistor 663. Alternatively, in order to minimize the effects of any mismatch between the resistors 661 and 663, smaller valued resistors may be substituted (e.g., 6K) and the ends of such resistors remote from terminals $T_4$ and $T_5$ may be connected together, the last-named connection, in turn, being coupled to the operating voltage via an additional common resistor (e.g., also 6K, not shown). An output signal filter capacitor 38 is coupled between terminals $T_4$ and $T_5$ external to the integrated circuit chip. Additional filter capacitors 673, 675 are connected from each of terminals $T_4$ and $T_5$ to ground external to the chip. Capacitors 673 and 675 are provided to reduce the dynamic range of the detected signals. The emitters of current source transistors 649 and 655 are returned to ground by means of resistors 655 and 667, respectively, and are cross-coupled by a resistor 669 to provide increased gain in the detector.

In operation, the illustrated oscillator circuit produces a substantially sinusoidal waveform at terminal $T_2$ at a nominal frequency of 228 KHz, the frequency being determined primarily by inductor 82 and capacitor 80.

The sinusoidal waveform produced across the resonant circuit 82, 80 is limited symmetrically by operation of the differential amplifier 609, 611, 617, 619 and associated components to produce a symmetrical substantially square wave having a fundamental frequency component at 228 KHz across resistor 615. This square wave is coupled via transistor 677 and the associated direct voltage translating means to the terminal $\bar{A}$ to provide one of a pair of complementary 228 KHz square wave outputs. The second 228 KHz square wave output A is provided by means of the additional voltage translation and inverter means 671. Typically, the voltage translating arrangements provide square waves having upper and lower voltage levels of almost two volts and ground.

The square wave outputs, A, $\bar{A}$ are processed by frequency divider and logic circuits in the manner described above in connection with FIGS. 1, 3 and 4 to produce, among other waveforms, a pair of complementary 19 KHz switching square waves E, $\bar{E}$ having a predetermined time relationship with respect to the 228 KHz square waves A, $\bar{A}$ as illustrated by the correspondingly labelled waveforms shown in FIG. 4. All positive-going and negative-going transitions of waveform E coincide with positive-going transitions of waveform A, the positive-going transitions of waveform E occurring in coincidence with every twelfth positive-going transition of waveform A.

The phase or time occurrence of the 19 KHz switching waveforms E, $\bar{E}$ is compared in AFPC detector 36 with the phase of the 19 KHz pilot signal supplied by amplifier 24. Differential direct voltages are produced across terminals $T_4$ and $T_5$ whenever the pilot signal component produced at the output of amplifier 24 is not in quadrature (90°) relationship with respect to the 19 KHz switching waveforms E, $\bar{E}$. The polarity of the direct voltage across terminals $T_4$ and $T_5$ is indicative of whether the pilot signal lags or leads the switching waveform. The differential direct voltages are supplied to current splitter transistors 641 and 643 in a manner to produce a reactive current in parallel with tuned circuit 82, 80 of sufficient magnitude to change the phase and/or frequency of oscillator 26 to restore the required quadrature relationship between the above-mentioned 19 KHz waveforms. The numerous outputs of the flip-flops illustrated in FIG. 3 are therefore maintained in predetermined time relationship with respect to the 19 KHz pilot signal output of amplifier 24, making it possible to utilize snychronous detection techniques to recover pilot signal, stereo difference signal and above-band noise information as will be explained below in connection with FIGS. 7, 8 and 9.

The non-synchronous components (i.e., all components other than the 19 KHz pilot signal) of the applied composite stereo signal, as well as the 19 KHz switching square waves E, $\bar{E}$ supplied to the base electrodes of transistors 651, 653, 657, 659 do not produce direct voltage components across the output terminals $T_4$, $T_5$ because of the doubly balanced nature of detector 36. Other higher frequency components generated by detector 36 are removed at the output of detector 36 by the low pass filtering of the capacitor 38 and associated resistances.

It should be noted that, initially, the operating frequency of oscillator 26 may be aligned by measuring the direct voltages at terminals $T_4$ and $T_5$ in the absence of a received stereo signal, tuning the receiver to a stereo signal and then varying the inductance (as by a tuning slug) of inductor 82 to restore the previously measured voltages. The oscillator 26 will then be operating at its nominal 228 KHz frequency in the desired time relationship with respect to the received 19 KHz pilot signal. This alignment procedure normally will be performed in the factory but, because of its simplicity and lack of complex test equipment, readily may be performed by a service technician in the home. This procedure is the only frequency alignment tha need be performed with respect to the entire decoder chip 22 illustrated in FIG. 1 and in subsequent figures of the drawing.

Figure 7:
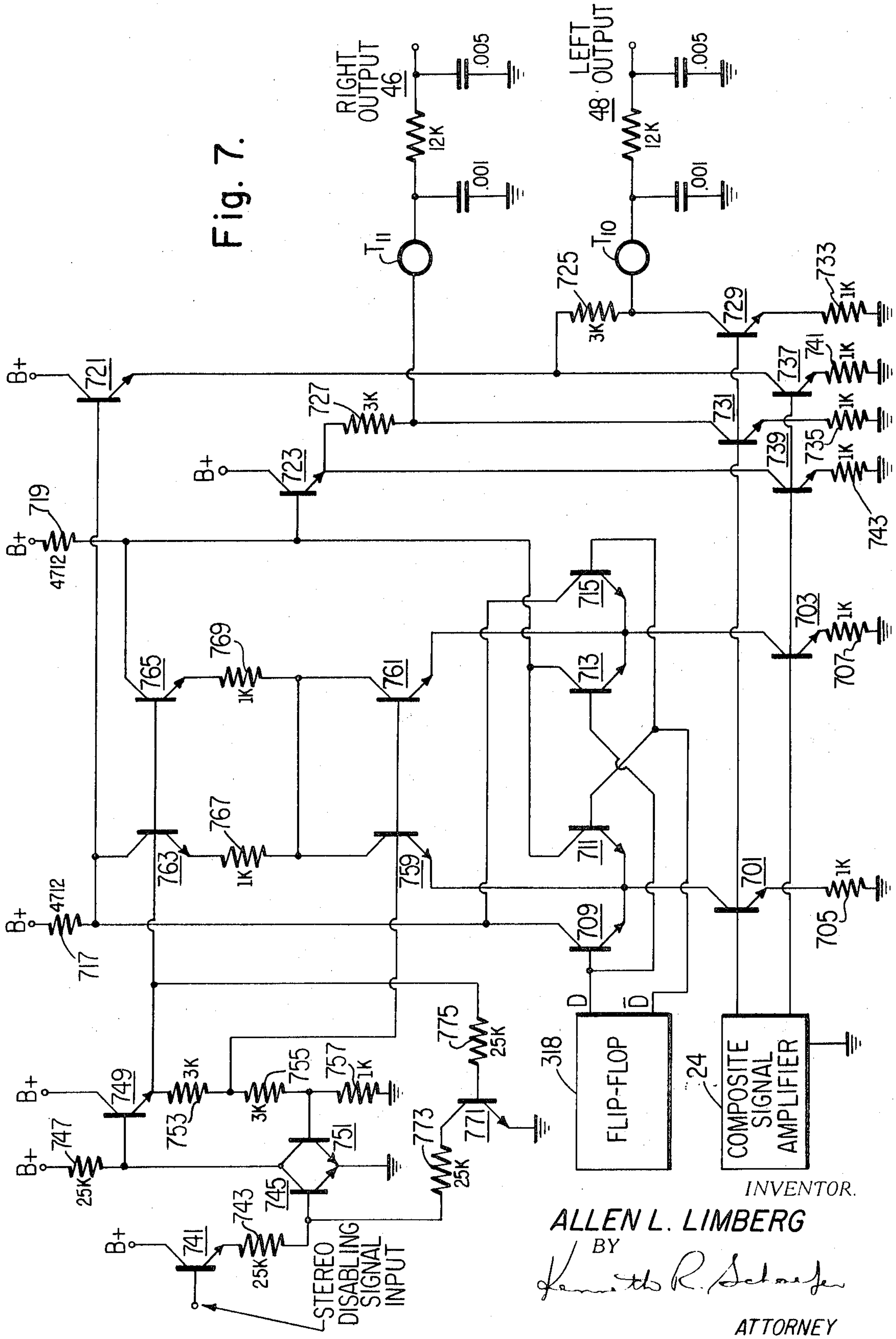
FIG. 7 is a schematic circuit diagram of a balanced synchronous stereophonic difference signal detector, automatic stereo switching means and matrix amplifiers for producing left and right audio signals adapted for construction in integrated circuit form for use in the system shown in FIG. 1.

Referring to FIG. 7 of the drawing, means are shown for detecting the difference signal (L−R) component of the composite stereo signal and for combining such component with the audio sum (L+R) signal component so as to produce stereophonically related left and right channel audio signals. The illustrated difference signal detector and combining (matrix amplifier) means are particularly adapted for fabrication using integrated circuit techniques and are arranged for connection to composite signal amplifier 24 (FIGS. 1 and 5) and flip-flop 318 (FIG. 3) all within integrated circuit chip 22.

The illustrated difference signal detector comprises a doubly balanced synchronous detector having first and second current source transistors 701 and 703 which correspond to transistors 561 and 563 in FIG. 5. The base electrodes of transistors 701 and 703 are directly connected to separate ones of the push-pull composite signal outputs of the composite signal amplifier 24 of FIG. 5. The emitter electrodes of transistors 701 and 703 are individually returned to ground by resistors 705 and 707, respectively. The collector electrode of transistor 701 is directly connected to joined emitter electrodes of a first pair of switching transistors 709, 711 while the collector electrode of transistor 703 is directly connected to joined emitter electrodes of a second pair of switching transistors 713, 715. The base electrodes of transistors 709 and 713 are connected to one of the complementary 38 KHz square wave outputs (D) of flip-flop 318 (FIG. 3) while the base electrodes of transistors 711 and 715 are connected to the other of the complementary 38 KHz square wave outputs ($\bar{D}$). A source of operating voltage (B+) is coupled to the collector electrodes of each of transistors 709 and 715 by means of an output resistor 717 and to the collector electrodes of each of transistors 711 and 713 by means of an output resistor 719 substantially equal to resistor 717.

Push-pull output signals including the demodulated difference signal components [(L−R) and −(L−R)] are developed across resistors 717 and 719 and are coupled, respectively to emitter follower transistors 721 and 723. Transistors 721 and 723 serve as voltage sources to produce the desired push-pull difference signal components across resistors 725 and 727, respectively. The sum (L+R) signal information is also developed, along with the remainder of the composite signal, across resistors 725 and 727 by means of transistors 729 and 731, the collector electrodes of which are coupled to resistors 725 and 727 and the base electrodes of which are coupled to one of the push-pull outputs (at which L+R is provided) of composite signal amplifier 24. The emitter electrodes of transistors 729 and 731 are returned to ground by means of individual resistors 733 and 735, respectively. Transistors 723 and 731 comprise matrix amplifier 42 (FIG. 1), the output of which (e.g., R) is coupled via terminal $T_{11}$, a de-emphasis network 46 and an audio power amplifier to audio reproducing means such as a loudspeaker. Transistors 721 and 729 comprise matrix amplifier 44 (FIG. 1), the output of which (e.g., L) is coupled via terminal $T_{10}$, a de-emphasis network 48 and a second audio power amplifier to audio reproducing means such as a second loudspeaker.

In order to reduce modulation of the base-emitter voltages of follower transistors 721 and 723 as the collector currents of transistors 729 and 731 vary, complementary composite signals with respect to the signals applied to transistors 729 and 731 are supplied from amplifier 24 to the base electrodes of compensating transistors 737 and 739. The collector electrodes of transistors 737 and 739 are directly connected, respectively, to the emitter electrodes of followers 721 and 723. The emitter electrodes of transistors 737 and 739 are returned to ground by separate resistors 741 and 743.

As the output signals produced by composite signal amplofier 24 vary, conduction of transistors 731 and 739 vary equally and oppositely (push-pull input signals). Therefore, the sum of the collector currents of transistors 731 and 739 (which load transistor 723) remains substantially constant. Similarly, variations in the output of composite signal amplifier 24 do not produce variations in the load on transistor 721 since the sum of the collector currents of transistors 729 and 737 remains substantially constant as the output of composite signal amplifier 24 varies. Accurate matrixing of the sum and difference signal components is therefore not compromised.

In the operation of the difference signal detector of FIG. 7, the complementary 38 KHz square wave outputs of flip-flop 318 (D, $\bar{D}$) are maintained in the appropriate, predetermined time relationship with respect to the received pilot signal component, as was explained above in connection with FIGS. 3 and 6, to achieve synchronous detection of the difference signal. The balanced synchronous detector comprising transistors 701, 709, 711 and transistors 703, 713, 715 provides complementary signal components including voltage components representative of (L−R) and −(L−R), respectively across resistors 717 and 719. The difference signal voltage components are coupled via follower transistors 721 and 723 and are combined, prior to de-emphasis, at resistors 725 and 727 with currents representative of the sum signal component (L+R) provided by amplifier 24. The sum signal current components are supplied by current source transistors 729 and 731 to their respective load resistors 725 and 727. The superposition of the difference signal voltage sources and the sum signal current sources provides the desired matrixing which is substantially independent of loading at the output terminals $T_{10}$and $T_{11}$. The de-emphasis networks 46 and 48 coupled to terminals $T_{10}$ and $T_{11}$ modify the matrixed signals to produce the desired left (L) and right (R) audio signal components. Because of the doubly balanced nature of the illustrated synchronous detector and the low pass characteristics of the de-emphasis networks 46, 48, components other than the desired left and right audio signals are not present across the output filter capacitors of the networks 46, 48.

Correct matrixing of the sum and difference signal components is dependent in part upon matching of the currents supplied by the source transistors 701, 703, 729 and 731. In the integrated circuit environment, uch matching is relatively easily accomplished by constructing substantially identical transistors 701, 703, 729, 731 and substantially identical associated emitter resistors 705, 707, 733 and 735 in close proximity on the chip 22.

Correct matrixing is also dependent upon the ratios of resistors 717 and 719 to resistors 725 and 727, respectively. In the illustrated doubly-balanced synchronous detector arrangement, the switching transistors 709, 711, 713, 715 are supplied with 38 KHz symmetrical square waves of correct phasing so that full wave detection of the 38 KHz difference signal subscarrier signal is obtained. The resultant peak to peak value of the audio frequency components of the detected difference signal is related to the peak rectified carrier wave at the output of the detector by a factor of $2/\pi$. The peak difference carrier wave for the composite signal is set by the standards for stereophonic broadcasting as equal to the peak sum component for a left only or a right only signal. Therefore, in order to obtain proper matrixing of the sum and difference signals, resistors 717 and 719 are selected $\pi/2$ times as large as the resistors 725 and 727 across which the sum signal components are developed.

The synchronous difference signal detector illustrated in FIG. 7 further comprises means for automatically disabling operation of the difference signal detection circuits either when the prolonged absence of pilot signal greater than a predetermined amplitude indicates that non-stereophonic (monophonic) program material is being received or when the signal-to-noise ratio of the received signal is judged too poor for satisfactory stereo reproduction. The manner in which a stereo disabling signal is derived will be described below in connection with FIGS. 8 and 9. For purposes of the present discussion it is sufficient to recognize that such a disabling signal is produced for either of the above-noted conditions.

In the apparatus shown in FIG. 7, stereo disabling signals are supplied to an amplifier comprising a first transistor 741 having a collector electrode connected to a source of operating voltage (B+), a base electrode coupled to a source of stereo disabling signals and an emitter electrode coupled via a resistor 743 to the base electrode of a switching transistor 745. The emitter electrode of transistor 745 is connected to ground and an output switching signal is derived at the collector electrode thereof across a resistor 747 coupled to the source of operating voltage. The output of switching transistor 745 is coupled to a multiple $V_{BE}$ bias supply of the type described in my U.S. Pat. Application Ser. No. 680,483, filed Nov. 3, 1967, entitled "Electrical Circuits" and assigned to the same assignee as the present invention. As used herein, the term $V_{BE}$ is defined as the forward voltage drop across the base-emitter function of a normally conducting transistor (e.g., approximately 0.65 to 0.7 volts for silicon transistors such as are fabricated in integrated circuits). Reference voltage supplies (usually internal to the integrated circuit) which provide one or more integral multiples of $V_{BE}$ above ground potential at a low impedance are designated as "multiple $V_{BE}$ supplies." In the present case, the multiple $V_{BE}$ supply comprises a common collector transistor 749 and a common emitter transistor 751 coupled together in a negative feedback arrangement. The collector electrode of transistor 749 is coupled to the source of operating voltage while a plurality of resistors 753, 755, 757 are coupled in series relation between the emitter electrode of transistor 749 and ground. The junction of resistors 755 and 757 is connected to the base electrode of transistor 751. The emitter electrode of transistor 751 is connected to ground while the collector electrode of transistor 751 is directly connected to the base electrode of transistor 749. As is explained in my application Ser. No. 680,483, when transistors 749 and 751 are conducting, a voltage equal to $V_{BE}$ exists across resistor 757. Resistor 757 is selected smaller than the base-emitter impedance of transistor 751 and the additional resistors 753, 755 are selected smaller than the input impedances of the respective circuits to which they are coupled. In that case, voltages are developed across each of the series connected resistors 753, and 755 equal to the product of $V_{BE}$ and the ratio between the particular resistor (753 or 755) and resistor 757. Specifically, in the circuit illustrated in FIG. 7, voltages of 7 $V_{BE}$ and 4 $V_{BE}$ are developed at the emitter electrode of transistor 749 and at the junction of resistors 753 and 755, respectively.

The junction of resistors 753 and 755 is coupled to the base electrodes of a pair of stereo disabling or stereo killer transistors 759 and 761. The emitter electrodes of transistors 759 and 761 are coupled, respectively, to the joined emitter electrodes of switching transistors 709, 711 and the joined emitter electrodes of switching transistors 713, 715. The collector electrodes of transistors 759 and 761 are directly joined together and this collector junction is connected to the emitter electrodes of current splitter transistors 763 and 765 via separate emitter resistors 767 and 769. The base electrodes of current splitter transistors 763 and 765 and 769 are directly connected to the emitter electrode of transistor 749 (7 $V_{BE}$ when the multiple $V_{BE}$ supply is operating). the collector electrodes of splitter transistors 763 and 765 and 769 are connected to resistors 717 and 719, respectively.

A feedback circuit is coupled between the input and output of the switched multiple $V_{BE}$ supply to increase the rate at which the system switches from stereophonic to monophonic mode. This circuit comprises a transistor 771 having a collector electrode coupled via a resistor 773 to the base electrode of transistor 745, a base electrode coupled via a resistor 775 to the emitter electrode of transistor 749 and an emitter electrode connected to ground.

In operation, upon the loss of stereophonic information suitable for reproduction as indicated by the apparatus to be described below in connection with FIGS. 8 and 9, the voltage at the base electrode of transistor 741 falls below a predetermined level (e.g., 1 volt) and transistors 741 and 745 begin to switch to an off or non-conductive condition. The voltage at the base electrode of transistor 749 increases positively causing transistor 749 and then transistor 751 to conduct so that the multiple $V_{BE}$ supply switches on. This switching action is aided by the presence of transistor 771 which commences conduction along with transistors 749 and 751. Transistor 771 serves to switch transistor 745 off rapidly once the switching operation begins. A positive voltage (4 $V_{BE}$) provided at the junction of resistors 753 and 755 causes killer transistors 759 and 761 to conduct. Similarly, a positive voltage (7 $V_{BE}$) provided at the emitter electrode of transistor 749 causes splitter transistors 763 and 765 to conduct.

When killer transistors 759 and 761 conduct, a sufficiently positive voltage (3 $V_{BE}$) is coupled to the joined emitter electrodes of switching transistors 709 and 711 and to the joined emitter electrodes of switching transistors 713, 715 to reverse bias such switching transistors and thereby disable the difference signal detector. The push-pull composite signals supplied via current source transistors 701 and 703 are then diverted through killer transistors 759 and 761 and cancel each other at the joined collector electrodes of transistors 759, 761. The joined collector electrodes of transistors 759 and 761 also serve to combine the direct current components of the outputs of current source transistors 701 and 703. The combined direct current components are then split into equal components by means of resistors 767, 769 and transistors 763, 765 and the equal components are coupled to load resistors 717 and 719. The direct bias voltage coupled to matrix transistors 721 and 723 is therefore maintained substantially equal for either stereophonic or monophonic reproduction modes. If such direct bias voltage was allowed to change when the operating mode of the system changed, a thump would be heard in the associated loudspeakers. The above-described arrangement precludes production of such an undesirable sound.

The difference signal detector is maintained in an inoperative or bypassed condition until an input to transistor 741 representative of the presence of adequate pilot signal is provided to switch transistors 741 and 745 on and to thereby switch the multiple $V_{BE}$ supply, and the killer and splitter stages off.

As noted above, an input signal greater than approximately 1 volt (low current $V_{BE}$ of transistor 741 plus moderate current $V_{BE}$ of transistor 745) is sufficient to maintain conduction of transistors 741 and 745 (and therefore maintain operation in the stereophonic mode). However, when transistors 741 and 745 are switched off and transistor 771 is on (i.e., monophonic operating mode), a positive voltage greater than 1 volt is required at the base of transistor 741 to re-initiate stereophonic operation since resistors 743 and 773 are then coupled via transistor 771 as a voltage divider across the input (base-emitter) terminals of transistor 745. An input voltage of approximately 3 $V_{BE}$ (approximately two volts) is thus required at the base of transistor 741 to switch to stereophonic mode. The difference between the levels required at the base of transistor 741 to initiate and to remain in stereophonic mode provides a desirable hysteresis characteristic whereby once stereophonic reproduction is initiated it will be maintained even though momentary fluctuations occur either in the received pilot signal level or in signal-to-noise ratio of the detected signal.

When stereophonic information suitable for reproduction is received and processed by the associated receiver (as indicated by the apparatus to be described below in connection with FIGS. 8 and 9), a sufficiently positive input voltage is supplied to the base of transistor 741 to render it conductive. Transistor 745 also conducts, so that the input to transistor 749 is not sufficiently positive to produce conduction in transistor 749. The multiple $V_{BE}$ supply comprising transistors 749 and 751 is therefore switched "off" and each of transistors 759, 761, 763 and 765 is switched "off." Under these conditions, the difference signal detector circuits operate to produce (L—R) and —(L—R) signals in the manner previously described. It should also be noted that transistor 771 is off under these conditions.

Referring to FIG. 8 of the drawing, means are illustrated for detecting the signal-to-noise ratio of the received composite signal and for providing a stereo disabling signal whenever such ratio is less than a predetermined limit suitable for acceptable stereophonic reproduction of program material. The illustrated signal-to-noise detector and associated circuits are particularly adapted for fabrication using integrated circuit techniques and are arranged for connection to composite signal amplifier 24 (FIGS. 1 and 5), and flip-flops 312, 318, 322, 328 (FIG. 3), all within integrated circuit chip 22.

The illustrated signal-to-noise detector comprises a balanced synchronous noise detector 68 having first and second current source transistors 801 and 803. The base electrodes of transistors 801 and 803 are directly connected to separate ones of the push-pull composite signal outputs of the composite signal amplifier 24 of FIG. 5. The emitter electrodes of transistors 801 and 803 are returned to ground by means of a single resistor 805. The collector electrode of transistor 801 is directly connected to joined emitter electrodes of a first pair of switching transistors 807, 809 while the collector electrode of transistor 803 is directly connected to joined emitter electrodes of a second pair of switching transistors 811, 813. The base electrodes of transistors 807 and 811 are connected to one of the complementary 114 KHz square wave outputs B, $\overline{B}$ of flip-flop 31 (FIG. 3) while the base electrodes of transistors 809 and 813 are connected to the other of the complementary square wave outputs B, $\overline{B}$. A source of operating voltage (B+) is connected directly to the collector electrodes of transistors 807 and 813 and is connected via the series combination of a forward biased voltage dropping diode 815 and a resistor 817 to the joined collector electrodes of transistors 809 and 811. The joined collected electrodes of transistors 809 and 811 are also coupled to terminal T14 of the integrated circuit chip and via a zener diode 819 to the operating voltage (B+) source. A capacitor 76, which determines the bandwidth of the noise detector 68, is coupled externally of the integrated circuit between terminal T14 and ground. A noise threshold control comprising adjustable resistor 821 coupled across the operating voltage source and a series resistor 823 coupled between terminal T14 and the wiper arm of resistor 821 may be provided external to the integrated circuit chip 22 for adjusting the level of signal-to-noise ratio at which stereophonic disabling signals are provided. A fixed acceptable signal-to-noise ratio also may be provided solely by components within chip 22 such that the circuit elements 821 and 823 may be omitted.

A differential noise sensing amplifier is provided comprising transistor 825 and a Darlington connected combination of transistors 827 and 829. The base electrode of transistor 829 is coupled to terminal T14. The base electrode of transistor 825 is coupled to a direct reference voltage supply indicated generally by the reference numeral 831. Reference voltage supply 831 is derived from a direct voltage balancing arrangement comprising differentially connected transistors 567 and 835 which are associated with the composite signal amplifier 24. The base electrodes of transistors 567 and 835 are directly connected to the base electrodes of transistors 517 and 547 described above in connection with FIG. 5. The collector electrodes of transistors 567 and 835 are coupled to the B+ operating voltage source by means of series connection of resistors 569 and 571. A direct reference voltage derived from the junction of resistors 569 and 571 is directly connected to the base electrode of transistor 825. This direct reference voltage supply is a direct current replica of the noise detector elements 801–817 and provides a direct bias which varies in the same manner as the quiescent direct bias provided at the base of transistor 829 by the noise detector.

The output of the differential noise sensing amplifier comprising transistors 825, 827, 829 is developed across a resistor 843 coupled between the B+ operating voltage source and the joined collector electrodes of transistors 827 and 829. An average detector including means for increasing the duration of noise-representative pulses is coupled to resistor 843. The average detector comprises a detector transistor 845 having an emitter electrode coupled to ground via a resistor 847, a collector electrode coupled to the B+ operating voltage source via a load resistor 849 and a base electrode coupled to a pulse stretching circuit indicated generally by the reference numeral 851 which will be explained below. The collector electrode of transistor 845 is coupled to terminal T8 of the integrated circuit chip (FIG. 1) and to OR circuit 66 associated with stereo disabling circuit 70 (FIG. 1). Capacitor 62*b* (see FIG. 1) is also coupled to terminal T8 and provides filtering of the output of transistor 845.

The pulse stretching circuit 851 comprises a bistable circuit having first and second transistors 853 and 855 arranged as a set-reset flip-flop. Noise indicative pulses developed across resistor 843 are coupled to the "set" terminal of the flip-flip (i.e., the base electrode of transistor 853) by means of a voltage translation and amplifying circuit comprising transistor 857, zener diode 859, resistor 861, resistor 863 and transistor 865. The elements 857, 859, 861 and 863 are coupled in the named order across the B+ operating voltage supply. The resistor 843 is connected to the base electrode of transistor 857 (which is of opposite type conductivity as compared to the vast majority of the transistors on the integrated circuit chip) while the base electrode of transistor 865 is connected to the junction of resistors 861 and 863. The collector electrode of transistor 865 is connected to the base electrode of transistor 853 and to the collector electrode of transistor 855. The base electrode of transistor 855 (the "reset" input of the set-reset flip-flop) is connected to a source of regularly recurring pulses provided by the combination of outputs from flip-flops 318, 322 and 328. Specifically, one of the 19 KHz square wave outputs ($\overline{E}$) of flip-flop 322, one of the 19 KHz outputs ($\overline{F}$) of flip-flop 328 and one of the 38 KHz outputs (D) of flip-flop 318 are combined in an OR function and inverted twice by means of an amplifier comprising transistors 867 and 869. The collector electrode of transistor 869 is connected to the base electrode of transistors 855 and 871 (as well as to the collector electrode of transistor 853). The stretched pulse output of the flip-flop 853, 855, which is developed at the collector electrode of transistor 853 as will appear below, is coupled via a voltage translating stage comprising transistor 871, resistors 873 and 875, transistor 877 and resistor 879 to the base electrode of detector transistor 845.

In the operation of the apparatus illustrated in FIG. 8, the direct reference voltage provided by the circuit indicated generally by the reference numeral 831 is related to the quiescent direct voltage supplied to the base of transistor 829 from the noise detector 68. That is, the current source transistors 801 and 803 are biased in the same manner as transistors 567 and 835, and since only one-half the direct current supplied by transistors 801 and 803 reaches load resistor 817, the corresponding load resistor 569 in the reference voltage supply 831 is selected to be one-half the load resistor 817. Resistor 571 simulates the effect of the switching transistors 809, 811 in the detector 68. Diode 815 provides a portion of the desired threshold offset between the inputs of transistors 825 and 827, as does the base-emitter conduction threshold of transistor 829. Since the reference voltage supply 831 and the detector 68 are supplied from a common B+ supply and are in the same environment on chip 22, variations in the one direct voltage will also appear in the other and the effect of such variations on the operation of the noise detector 68 will be avoided.

As is well known in the FM radio receiver art, the peak amplitude of audio (and higher frequency) signals provided at the output of the FM detector 20 will be substantially constant irrespective of the particular reception conditions (i.e., r-f signal level and tuner noise). That is, the peak detected signal amplitude is set by the frequency deviation established at the signal transmitter and the transfer characteristics of the detector, not by the received signal amplitude. Amplifier 24 is arranged to provide a stable gain characteristic. Therefore, it is possible to utilize a substantially constant direct voltage as a measure of signal level at the output of amplifier 24. This direct voltage, provided by circuit 831 then may be compared with detected noise components to measure signal-to-noise ratio. Where the variable resistor 821 is provided, it is manually adjusted (e.g., factory adjustment) to provide a bias voltage to maintain transistors 827 and 829 cut off for all detector output signals at terminal T14 less than the acceptable out-of-band noise level established by such adjustment.

The push-pull composite signal outputs of amplifier 24 are supplied to current source transistors 801 and 803. Swtiching transistors 809 and 811 are switched alternately between saturation and cutoff by means of their respective 114 KHz square wave input signals $\overline{B}$ and B supplied by flip-flop 312. Noise in the composite signal output of amplifier 24 at or near the 114 KHz switching rate is translated by the heterodyning action of detector 68 to a band of frequencies extending upwardly from zero frequency while other components in the composite signal are translated outside the low pass characteristics of the filter comprising capacitor 76 and the associated resistors (e.g., resistors 821 and 823). Capacitor 76 is selected in conjunction with such resistors to provide the desired noise detector frequency response. Noise within the predetermined bandwidth around 114 KHz produces pulses at terminal T14. Transistors 827 and 829 are responsive to positive going pulses having an amplitude which, in conjunction with the bias voltage provided via resistor 821 across capacitor 76, is sufficient to overcome the bias provided via transistor 825. Each such positive going pulse, representative of the presence of excessive out-of-band noise, is translated and inverted by means of the circuit comprising transistors 827, 829, 857, 865 and associated components. The resultant negative-going pulses are coupled to the base electrode of transistor 853 to place the set-reset flip-flop 853, 855 in its set condition (i.e., transistor 853 off, transistor 855 on and the output supplied to transistor 871 in the high voltage or 1 state). Flip-flop 853, 855 will remain in the 1 state until the next negative-going transition occurs in the "reset" input supplied to the base electrode of transistor 855 from transistor 869. The generation of the reset pulses is illustrated in FIG. 4 by means of the three waveforms labelled E+ F, E+F+$\overline{D}$, and $\overline{E+F+D}$. Generation of such reset pulses takes advantages of the fact as noted above in connection with FIG. 3, that the output of flip-flop 328 is delayed by a small interval (e.g., of the order of five microseconds) as compared to the transitions of the main triggering waveforms provided by oscillator 26. The reset pulse is generated during this small interval.

When multivibrator 853, 855 is in the 1 state (excessive noise present), transistors 871, 877 and 845 are all conductive and capacitor 62*b* discharges. If the excessive noise is present for a sufficient duration, capacitor 62*b* discharges sufficiently to activate OR circuit 66 and thereby activate stereo disabling circuit 70 as will be pointed out more fully below in connection with the description of FIG. 9.

In the absence of noise-representative pulses at the set input of flip-flop 853, 855, the pulses supplied to the base of transistor 855 maintains flip-flop 853, 855 in the reset condition so that transistors 871, 877 and 845 are all turned off. The voltage across capacitor 62*b* is then representative only of the presence or absence of pilot signal (see FIG. 9 below) and appropriate operation of the stereo disabling circuit 70 follows.

The apparatus comprising flip-flop 853, 855 and flip-flop 322 serves to stretch the detected noise-representative pulses so as to provide an effective increase in detection gain of such noise pulses without requiring an increase in the amplitude (dynamic range) of signal handled by, for example, detector transistor 845 and preceding transistor stages.

Specifically, it can be seen that the randomly occurring noise-representative pulses, which are characteristically of short duration and varying amplitude, when processed by multi-vibrator 853, 855, are converted to pulses of varying duration (dependent upon the relative timing of the reset pulse waveform and detected noise pulses) and fixed amplitude (determined by 1 state output voltage of 853, 855). Depending upon the relative timing of the reset pulses and the detected noise-representative pulses, the output of multivibrator 853, 855 may be in the 1 state as long as the 19 KHz period or as short as zero time. Therefore, the average duration of the processed pulses provided by multivibrator 853, 855 will be one-half the period of the applied reset waveform (i.e., approximately 25 microseconds).

The noise-representative direct voltage produced at the output (collector electrode) of detector transistor 845 is therefore enhanced or increased by the pulse stretching operation of flip-flop 853, 855 and associated circuits.

The pulse-stretching noise detector described above, unlike a simple noise integrator or high gain noise amplifier, discriminates between the sustained presence of relatively low level noise greater than the preset noise threshold level (a condition where switching to monophonic reception is desired) and the momentary presence of high level, short duration bursts of static noise (a condition which is temporary and therefore switching to monophonic reception is not desired). That is, while the noise threshold circuit 825, 827, 829 provides an output which includes the amplitude characteristics of the detected noise, the set-reset flip-flop 853, 855 normalizes the amplitudes of the above-threshold noise pulses. The set-reset flip-flop 853, 855 serves effectively to amplify the short duration pulses relative to long duration pulses by stretching each of such types of pulses on the average to an equal extent determined by the reset rate of flip-flop 853, 855 (19 KHz in the present case). The amplitudes of the noise pulses which trigger flip-flop 853, 855 are indistinguishable from each other at the output of flip-flop 853, 855. The normalized output of flip-flop 853, 855 is then supplied to a signal integrating means (capacitor 62*b*) which serves to convert the stretched durations of the detected pulses to voltage amplitudes. The subsequent stereophonic-monophonic mode switching circuitry (FIGS. 7 and 9) is arranged to respond to a relatively high voltage across capacitor 62*b* which is representative of the sustained presence of noise in excess of the preset noise threshold. The momentary presence of large amplitude noise in excess of the permissible noise threshold produces only a comparatively low voltage across capacitor 62b and does not activate the mode switching apparatus.

In FIG. 8, a voltage supply is illustrated which is suitable for supplying voltage levels of, for example, +6.2 volts and +3 $V_{BE}$ volts which are useful in other portions of the chip 22 (e.g., the flip-flops shown in FIGS. 2 and 8). Numerous voltage supply configurations may be used and that which is shown is included only for the purpose of showing one complete configuration for the various portions of chip 22.

In the voltage supply shown in FIG. 8, an external source of B+ voltage (e.g., +8.5 volts) is coupled via chip terminal $T_{12}$ to the collector electrode of a first emitter follower transistor 802. The emitter electrode of transistor 802 is returned to ground via the series combination of a resistor 804 and a plurality of transistors 806, 808, 810 and 812. Each of transistors 806 and 810 is connected as a diode with its collector electrode directly connected to its base electrode. The emitter electrodes of transistors 806 and 810 are connected, respectively, to the base electrodes of transistors 808 and 812. The collector electrodes of transistors 806 and 808 are directly connected together and to the end of resistor 804 remote from the emitter electrode of transistor 802. The collector electrodes of transistors 810 and 812 are directly connected together and to the emitter electrode of transistor 808. The emitter electrode of transistor 812 is connected to ground. Bias is provided at the base electrode of transistor 802 by means of a voltage divider coupled between terminal $T_{12}$ and ground, the divider comprising the series combination of a resistor 814, a zener diode 816 (exhibiting a nominal zener voltage of 5.5 volts) and the combination of transistors 810 and 812. An amplifier having a low output impedance is coupled to the junction of resistor 804 and the joined collector electrodes of transistors 806 and 808. The amplifier comprises a collector load resistor 818 coupled between the terminal $T_{12}$ and the collector electrode of a transistor 820, a further transistor 822 having a collector electrode directly connected to the emitter electrode of transistor 820, an emitter resistor 824 connected between the emitter electrode of transistor 822 and ground, and a feedback connection comprising a zener diode 826 connected from the collector electrode of transistor 820 to the base electrode of transistor 822 and a resistor 828 connected from the base electrode of transistor 822 to ground.

In operation, transistor 802 is biased to conduction by means of the base biasing circuit comprising circuit elements 814, 816, 810 and 812. The transistors 810 and 812 are conductive and provide a nominal direct voltage of +2 $V_{BE}$ at the base electrode of transistor 810 (the designation $V_{BE}$ being defined as a range of voltage values which exist across the base-emitter junction of a transistor when that junction is conductive). It should be recognized that in the illustrated arrangement, the transistor 812 will conduct more than transistor 810 and therefore the base-emitter voltage of the former will actually be somewhat greater than that of the latter. However, this difference is unimportant for present purposes and will be ignored.

Since transistor 802 is conductive, a voltage drop of $V_{BE}$ is produced across its base-emitter junction. Therefore, the voltage at the emitter electrode of transistor 802 will be equal to the sum of the voltage across zener diode 816 and one $V_{BE}$ (e.g., approximately +6.2 volts).

Transistors 820 and 822 are also biased for conduction, the base electrode of transistor 820 being at a voltage of +4$V_{BE}$ by virtue of the operation of the combination of transistors 806, 808, 810 and 812. The emitter electrode of transistor 820 is therefore maintained at +3$V_{BE}$ (e.g., approximately 2 volts) and provides a low impedance voltage source for use in numerous flip-flops on chip 22 as set forth above.

Referring to FIG. 9 of the drawing, means are shown for producing indications of the reception of stereophonic broadcast material which is suitable for reproduction. The illustrated apparatus, which includes a pilot presence detector and means for providing automatic stereo switching signals is particularly adapted for fabrication using integrated circuit techniques and is arranged for connection to composite signal amplifier 24 (FIGS. 1 and 5), flip-flop 328 (FIG. 3), the stereo disabling apparatus (FIG. 7) and the noise sensing apparatus (FIG. 8) within integrated circuit chip 22.

The illustrated pilot presence detector comprises a doubly balanced synchronous detector having first and second current source transistors 901 and 903. The base electrodes of transistors 901 and 903 are connected to separate ones of the push-pull composite signal outputs of the composite signal amplifier 24 of FIG. 5. The emitter electrodes of transistors 901 and 903 are coupled together by a resistor 905 and are individually returned to ground by resistors 907 and 909, respectively. The collector electrode of transistor 901 is directly connected to joined emitter electrodes of a first pair of switching transistors 911, 913 while the collector electrode of transistor 903 is directly connected to joined emitter electrodes of a second pair of switching transistors 915, 917. The base electrodes of transistors 911 and 915 are connected to one of the complementary square wave outputs F, $\bar{F}$ of flip-flop 328 of FIG. 3 while the base electrodes of transistors 913 and 917 are connected to the other of the complementary square wave outputs F, $\bar{F}$. The collector electrodes of transistors 911 and 917 are connected to an output terminal $T_8$ while the collector electrodes of transistors 913 and 915 are connected to an output terminal $T_7$. Filter capacitors 62*a* and 62*b* mounted external to chip 22 are coupled from terminals $T_7$ and $T_8$ to ground. The base-emitter junction of a clamping transistor 921 is connected between terminals $T_7$ and $T_8$. A source of operating voltage (B+) is directly connected to the collector electrode of transistor 921, to the collector electrodes of transistors 911 and 917 by means of resistor 849 (see also FIG. 8) and to the collector electrodes of transistors 913 and 915 by means of the series connection of resistors 923 and 925. A differential sensing amplifier comprising transistors 927 and 929 is coupled to the terminals $T_7$ and $T_8$. The emitter electrodes of transistors 927 and 929 are coupled by means of a common resistor 931 to ground. The base electrode of transistor 927 is supplied with the output developed at the collector electrodes of transistors 911 and 917 by coupling that base electrode to terminal T. The noise presence indicative output of transistor 845 (FIG. 8) is also coupled to terminal $T_8$. The base electrode of transistor 929 is supplied with the output developed at the collector electrodes of transistors 913 and 915 by coupling that base electrode to the junction of divider resistors 923 and 925. Resistors 923 and 925 are selected to maintain transistor 929 conductive in the absence of a differential voltage (i.e., in the absence of a pilot presence indication) across terminals $T_7$ and $T_8$. The collector electrode of transistor 929 is connected directly to the operating voltage supply (B+) while the collector electrode of transistor 927 is coupled via an output load resistor 933 to the operating voltage supply (B+). Signals developed across resistor 933, representative of the combination of the presence of a 19 KHz pilot component and the absence of excessive noise in the output of amplifier 24 (as will be explained below), are coupled to a level translating stage comprising an emitter follower transistor 935, an emitter load resistor 941 and a zener diode 939 coupled between resistor 941 and the emitter of transistor 935. The collector electrode of transistor 935 is connected to the operating voltage supply. The junction of resistor 941 and diode 939 is coupled in parallel to the base electrodes of a first common emitter transistor 937 and a further common emitter transistor 947 via identical resistors 945 and 943, respectively. The collector electrode of transistor 947 is coupled to an operating voltage (+6.2V) by a load resistor 971. Signals developed across resistor 971 are coupled via an emitter follower transistor 973 and a time constant network 975 to the stereo disabling input of transistor 741 (FIG. 7). Time constant network 975 comprises an emitter resistor 977 coupled between the emitter electrode of transistor 973 and ground, a relatively large series coupling resistor 979 connected from the emitter electrode of transistor 973 to the base electrode of transistor 741 and a filter capacitor 72 coupled from the base electrode of transistor 741 to ground. Capacitor 72 is mounted external to chip 22 and is coupled via terminal $T_{13}$ to chip 22.

Returning to the second load coupled across resistor 941, the collector electrode of transistor 937 is coupled via the series combination of a resistor 949 and a diode 951 to the source of operating voltage (B+).

The collector electrode of transistor 937 is also coupled to an emitter follower transistor 955. Transistors 937 and 955 and associated components are arranged as a regenerative switching or "latch" circuit having two stable states, the latch circuit being indicated generally as the numeral 919. To this end, the series combination of a zener diode 963 and an emitter resistor 957 is coupled between the emitter electrode of transistor 944 and ground. An emitter resistor 959 is coupled between the emitter electrode of transistor 937 and ground. A diode 961 is coupled between the ends of resistors 957 and 959 remote from ground. An output is derived from transistor 955 by means of a resistor 965 coupled from the junction of resistor 957 and zener diode 963 to output terminal $T_9$ of chip 22. The output developed at terminal $T_9$ is coupled to the base electrode of a lamp supply transistor 967 arranged in a grounded emitter configuration (external to chip 22). A pilot indicator lamp 969 is coupled between the collector electrode of transistor 967 and an appropriate external direct voltage supply capable of lighting lamp 969.

In the operation of the pilot presence detector the push-pull composite signals supplied by amplifier 24 to current source transistors 901 and 903 are synchronously demodulated by means of the complementary 19 KHz square waves F, $\bar{F}$ supplied to switching transistors 911, 917, 915, 913. When the composite signal includes a continuous 19 KHz pilot component indicative of reception of stereo broadcast material, differential direct voltage components are produced by the detector arrangement across capacitors 62*a* and 62*b*. The system (particularly the phasing of flip-flop 328) is arranged such that with oscillator 26 operating properly, the resulting direct voltage component across capacitor 62*b* is more positive than the direct voltage component produced across capacitor 62*a*. Transister 927 therefore is rendered conductive when pilot signal is present. When transistor 927 conducts, transistors 935 and 937 decrease conduction.

As transistor 937 decreases conduction, transistor 955 increasingly conducts. The voltage at the emitter electrode of transistor 955 becomes more positive and, when it exceeds the sum of the zener breakdown voltage of diode 963 plus the forward voltage of diode 961, a positive voltage is coupled to the emitter electrode of transistor 937 to turn transistor 937 off and maintain it off. At the same time, when the emitter voltage of transistor 955 is sufficiently positive, transistor 967 is turned on. Indicator light 969 is therefore energized to indicate reception of stereo broadcast material to the listener.

Under these conditions (stereo presence indicated by conduction of transistor 927), transistor 947 also is rendered non-conductive and transistor 973 conducts. Capacitor 72 begins to charge to a positive voltage via transistor 973 and resistor 979 at a predetermined rate. After a predetermined continuous interval of stereophonic reception (e.g., 1 second), capacitor 72 charges sufficiently to render transistor 741 (FIG. 7) conductive, thereby initiating the operating cycle described above in connection with FIG. 7 for enabling the stereo difference signal detector. The delay provided by the combination of resistor 979 and capacitor 72 is selected to reasonably assure continued stereo reproduction once it is initiated.

In the absence of substantially continuous 19 KHz pilot signal component at the output of amplifier 24, the differential direct voltage component between terminals $T_8$ and $T_7$ will not be sufficiently positive to maintain transistor 927 conductive and, because of the differential connection of transistors 927 and 929, transistor 929 tends to conduct. Resistors 923 and 925 are selected to maintain transistor 929 biased for conduction for this condition (i.e., absence of 19 KHz pilot signal). As transistor 927 ceases conduction, transistor 935 conducts and provides an input to transistor 937 of the proper sense to render transistor 931 conductive. Transistor 937 remains non-conductive until transistor 935 conducts sufficiently to overcome the reverse bias coupled to the emitter electrode of transistor 937 by transistor 955. When this bias is overcome and transistor 937 conducts, transistors 955 and 967 are switched off. The stereo indicator light 969 is thereby extinguished. At the same time, since transistor 935 conducts, transistor 847 conducts. Transistor 947 is arranged in a grounded emitter configuration which serves to invert the applied signal and thereby renders transistor 973 non-conductive. Capacitor 72 discharges at a relatively slow rate determined by resistors 977 and 979 such that, after a predetermined time interval during which no pilot signal is detected, capacitor 72 discharges sufficiently so that transistor 741 (FIG. 7) also is rendered non-conductive. The stereo diabling circuitry described above in connection with FIG. 7 thereupon operates to switch the apparatus of FIG. 7 to the monophonic reproduction mode.

It can thus be seen that the voltage delay associated with transistor 937 switching on the time constant delay associated with discharge of capacitor 72 serve, respectively, to maintain indicator lamp 969 on and stereo switching transistor 741 off for an interval after pilot signal level decreases below the level initially required to switch the system into stereophonic reproduction mode. In this manner, short term fading or drop-out of the pilot signal will not interrupt stereo reproduction.

In the case where sufficient pilot signal is present for stereophonic reproduction but an unacceptable signal-to-noise ratio is present, the following operation results. As explained above in connection with the apparatus shown in FIG. 8, an unacceptable signal-to-noise condition is indicated by conduction of transistor 845. When transistor 845 conducts, the voltage at terminal $T_8$ (the base electrode of transistor 927) decreases to a relatively low value. Clamping transistor 921 insures that terminal $T_8$ declines only to a value substantially one $V_{BE}$ less than terminal $T_7$ to prevent interference with the proper biasing of the pilot-presence synchronous detector under these conditions. Transistor 929 is maintained conductive by reason of its fixed base bias provided via resistors 923 and 925 and transistor 927 is cut off. The presence of pilot signal at the output of amplifier 24 is ineffective to change the voltage across capacitor 62*a* under these conditions. The stereo indicator light 969 therefore is shut off and a disabling signal is supplied to transistor 741 so as to place the system in the monophonic reproduction mode.

Certain aspects of the stereophonic decoder system described above which pertain to relationships among several of its subsystems will now be described.

The stereophonic decoder chip 22 and associated external components are arranged, in several respects, to provide high performance when noise components are present in the processed composite signal and to discriminate against such noise components in favor of transmitted signal components. The manner in which the system precludes operation in the stereophonic mode when excessive noise is present was described in detail in connection with FIGS. 7, 8, and 9. The signal-to-noise detector arrangement shown in FIG. 8 and the additional apparatus shown in FIGS. 7 and 9 for switching between monophonic and stereophonic reproduction modes also are arranged to discriminate between actual unacceptable signal-to-noise conditions and certain acceptable signal conditions which might be misconstrued as containing excessive noise.

For example, when the composite signal provided by amplifier 24 includes particularly high level signals (e.g., repetitive cymbal crashes in an orchestral selection), such signals may also be accompanied by spurious ultrasonic components which are produced as a result of over-modulation and the resultant generation of harmonic distortion components at the broadcast transmitter. It is likely that such spurious harmonic components will fall within the band of frequencies to which the noise detector (FIG. 8) is sensitive. That noise detector therefore is arranged and automatically to change the acceptable level of ultrasonic components (e.g., in the vicinity of 114 KHz) and thereby maintain continuous stereophonic reproduction of such high level signals even though a relatively high level of ultrasonic components is present. A noise detector having a threshold which remains fixed under such signal conditions undesirably could cause switching to the monophonic mode.

Referring to FIG. 8, the automatic noise threshold adjustment is accomplished by virtue of the manner in which transistors 801, 803, 807, 809, 811 and 813 are arranged. Specifically, when normal or relatively low level composite signals are supplied by amplifier 24 to current source transistors 801 and 803, the switching transistors 807, 809, 811 and 813 operate as a synchronous detector to produce across resistor 817 an output signal which is relatively linearly related to the 114 KHz components of the composite signal. A relatively constant quiescent direct current flows in resistor 817. For high amplitude composite signals, however, one of the transistors 801 and 803 is driven to cutoff as the other is driven to high conduction. This result follows because of the common connection of the emitters of transistors 801 and 803 to resistor 805. Under these conditions, a direct current component greater than the normal quiescent direct current component is produced in resistor 817. For sustained high level composite signals, the direct voltage across resistor 817 will therefore increase and the resultant reference voltage across capacitor 76 will decrease. Therefore, the level of detected noise required to exceed the threshold of operation of transistors 829, 827 will increase. Thus for high level composite signals, the acceptable level of components around 114 KHz is automatically increased.

The above-described operation of the noise detector may also be considered as providing the desirable characteristic of a noise detector which is more sensitive to noise during periods of low signal modulation than during periods of high signal modulation.

It is possible, in view of this self-adjusting characteristic of the noise detector for high and low level signals and the noise amplitude compression characteristics of the noise pulse stretcher described in connection with FIG. 8 above, to employ a wider detection bandwidth for the noise detector than would be practical in the absence of such characteristics.

Typically a bandwidth (determined essentially by capacitor 76, resistor 817 and resistors 821 and 823 if used) of the order of 20 KHz may be employed, which results in an acceptable noise sensitivity characteristic for the noise detector. The self-adjusting feature also makes it possible to eliminate the threshold adjustment components 821, 823 without undue restriction on tolerances of remaining components of the detector.

Certain other aspects of this system contribute to its ability to provide quiet, noise-free stereophonic reproduction. In particular, the 38 KHz difference channel subcarrier is regenerated in the above-described system essentially free of spurious modulation components such as is encountered, for example, in conventional pilot signal frequency doublers employed for subcarrier regeneration.

Typically, pilot signal doubler arrangements comprise a 19 KHz tuned bandpass circuit, two or more frequency doubler rectifiers and a 38 KHz tuned bandpass circuit. The 38 KHz subcarrier regenerated by such a system is contaminated by amplitude modulation noise components which, if the noise is in or near the audio frequency range, produce, after detection, audible outputs in the associated sound reproducing apparatus. Furthermore, the regenerated subcarrier in such a system is contaminated with frequency and phase modulation noise components which adversely affect stereophonic separation of the detected audio signals.

While a portion of the undesired noise components may be eliminated in the subcarrier regeneration channel by narrowing the bandwidth of the tuned bandpass circuits, a practical lower limit of this bandwidth exists because of the phase sensitivity of a narrow band filter. That is, as the bandwidth of the channel is decreased, the rate of change of phase error as a function of deviation from the center frequency of the bandpass circuit increases. Therefore, a relatively slight mistuning of a narrow bandwidth channel will produce a relatively large error in the phase of the regenerated subcarrier and thereby adversely affect stereophonic separation. Furthermore, narrow bandwidth subcarrier regeneration circuits generally exhibit an asymmetrical bandpass characteristic which will also result in subcarrier phase variations and attendant loss of separation in the presence of noise.

In the presently described system, a 38 KHz switching waveform or regenerated subcarrier is produced by processing (dividing) the output of oscillator 26, which output is maintained in timed relation with the received pilot signal by means of synchronous AFPC circuit 36 (see FIG. 6). A characteristic of this arrangement of oscillator 25 and AFPC circuit 36 is that the oscillator 36 is substantially insensitive to amplitude, phase or frequency modulation of the pilot signal by noise components in and near the audible spectrum. Thus the 38 KHz switching subcarrier which is derived from the output of oscillator 26 is also free of such undesired noise components.

Specifically, because of the synchronous, quadrature relationship between the received pilot signal and the 19 KHz reference switching waveform supplied to AFPC detector 36, the control voltage output of detector 36 is substantially free of noise-induced amplitude variations of the pilot signal. Therefore, the phases (as well as the amplitudes) of the output of oscillator 26 and the generated 38 KHz switching waveforms are each free of the effect of such noise components.

With regard to noise induced frequency and phase modulation components of the pilot signal, the bandwidth of AFPC detector 36, which is determined by associated resistance-capacitance filter elements rather than by tuned circuits, may be made extremely small (of the order of 10–20 Hz) while the loop gain of the AFPC system is selected sufficient to acquire and maintain phase and frequency lock of oscillator 26. In that case, the noise-induced phase and frequency modulation components of the pilot signal pass through the switching transistors of AFPC detector 36 but are almost entirely removed from the AFPC control signal by means of the narrow band R-C filter at the output of the AFPC detector 36. This filtering process decouples oscillator 26 (and therefore the generated 38 KHz switching waveform) from the audio frequency phase and frequency modulation components which accompany the pilot signal during noisy reception.

While the present invention has been described above in terms of a complete stereophonic decoding system, various of the subsystems may be employed separately to advantage. Furthermore, modifications may be made to the subsystems without departing from the scope of the various aspects of the present invention (e.g., all inductors may be eliminated by using a different type oscillator).

Reference has been made to several pending U.S. patent applications in the preceding description. In addition, the following applications, filed concurrently herewith, relate to the composite signal amplifier 24, noise sensing apparatus and matrix amplifier arrangement, respectively:

U.S. Pat. application Ser. No. 888,391, now U.S. Pat. No. 3,622,903, entitled "High Gain Differential Amplifier", of Steven A. Steckler;

U.S. Pat. application Ser. No. 888.365, now U.S. Pat. No. 3,629,611 entitled "Electronic Processing Apparatus," of Allen L. Limberg;

U.S. Pat. Application Ser. No. 888,390, now U.S. Pat. No. 3,707,603 entitled "Amplifier," of Allen L. Limberg.

What is claimed is:

1. In a radio receiver for developing signals from a received transmission including a carrier wave modulated by a composite signal comprising at least a modulated suppressed subcarrier component and a pilot component having a predetermined time and frequency relationship with respect to said subcarrier, the combination comprising:

oscillator means for providing a recurring wave having a fundamental frequency component;

first means comprising first frequency dividing means coupled to said oscillator means for producing a first reference wave in predetermined time-frequency relation with said fundamental frequency component, the frequency of said first reference wave being (1/M) times said fundamental frequency component where M is an integer greater than unity;

signal coupling means for coupling signals extending over substantially the entire frequency range of said composite signals;

synchronous phase detection means coupled to said first means and direct coupled in a balanced manner to said signal coupling means for developing control signals representative of phase differences between said first reference wave and said pilot component;

means coupled to said oscillator means and responsive to said control signals for varying the phase and frequency of said oscillator means to maintain said fundamental frequency component at a frequency equal to M times said pilot component frequency and to maintain said fundamental component in predetermined timed relation with respect to said pilot component;

second means coupled to said oscillator means for producing at least a second reference wave having a predetermined time-frequency relationship with respect to said fundamental component different from that of said first reference wave; and additional synchronous detection means coupled at least to said second means and to said signal coupling means for detecting components of said composite signal synchronous at the frequency of said second reference wave.

2. The combination according to claim 1 wherein:

said second means comprises second frequency dividing means for producing a second reference wave at a second frequency less than the frequency of said fundamental component.

3. The combination according to claim 1 wherein:

said second reference wave is at a frequency equal to said subcarrier frequency; and said additional synchronous detection means is arranged for synchronously detecting the modulation information of said suppressed subcarrier component.

4. The combination according to claim 2 wherein:

said phase detection means comprises a synchronous quadrature phase detector for producing control signals substantially free of amplitude modulation components of said pilot signal.

5. The combination according to claim 4 wherein:

said synchronous quadrature phase detector comprises a sub-audio bandwidth output circuit for providing substantially noise-free control signals.

6. The combination according to claim 4 wherein:

said multiple (M) is an even integer greater than two;

said suppressed subcarrier component includes amplitude modulation information corresponding to stereophonically related audio difference signals, and said synchronous modulation detection means is arranged to produce oppositely phased audio difference signals.

7. In a radio receiver for developing signals from a received transmission including a carrier wave modulated by a composite signal comprising at least a modulated suppressed subcarrier component and a pilot component having a predetermined time and frequency relationship with respect to said subcarrier, the combination comprising:

oscillator means for providing a recurring wave having a fundamental frequency component;

first means coupled to said oscillator means for producing a first reference wave in predetermined time-frequency relation with said fundamental frequency component, the frequency of said first reference wave being (1/M) times said fundamental frequency component where M is an integer;

signal coupling means for coupling signals extending over substantially the entire frequency range of said composite signals;

synchronous phase detection means coupled to said first means and to said signal coupling means for developing control signals representative of phase differences between said first reference wave and said pilot component;

means coupled to said oscillator means and responsive to said control signals for varying the phase and frequency of said oscillator means to maintain said fundamental frequency component at a frequency equal to M times said pilot component frequency and to maintain said fundamental component in predetermined timed relation with respect to said pilot component;

second means coupled to said oscillator means for producing at least a second reference wave having a frequency equal to the frequency of said pilot component and in quadrature phase relation with said first reference wave; and additional synchronous detection means coupled at least to said second means and to said signal coupling means for developing indications of presence in said composite signals of said pilot component.

8. The combination according to claim 7 wherein:

said first and second means comprise frequency dividing means for producing said first and second reference waves.

9. The combination according to claim 8 wherein:

said first and second frequency dividing means comprise bistable counters coupled to said oscillator means for producing frequency divided outputs in fixed time relation with said fundamental frequency component.

10. In a radio receiver for developing signals from a received transmission including a carrier wave modulated by a composite signal comprising at least a modulated suppressed subcarrier component and a pilot component having a predetermined time and frequency relationship with respect to said subcarrier, the combination comprising:

oscillator means for providing a recurring wave having a fundamental frequency component;

first means coupled to said oscillator means for producing a first reference wave in predetermined time-frequency relation with said fundamental frequency component, the frequency of said first reference wave being (1/M) times said fundamental frequency component where M is an integer;

signal coupling means for coupling signals extending over substantially the entire frequency range of said composite signals;

synchronous phase detection means coupled to said first means and to said signal coupling means for developing control signals representative of phase differences between said first reference wave and said pilot component;

means coupled to said oscillator means and responsive to said control signals for varying the phase and frequency of said oscillator means to maintain said fundamental frequency component at a frequency equal to M times said pilot component frequency and to maintain said fundamental component in predetermined timed relation with respect to said pilot component;

second means coupled to said oscillator means for producing at least a second reference wave at a frequency greater than the highest signal component frequency of said composite signal; and additional synchronous detection means comprising noise detection means coupled at least to said second means and to said signal coupling means for developing indications of presence in said composite signal of above-band noise components.

11. The combination according to claim 10 wherein:

said noise detection means comprises a source of threshold voltage representative of composite signal level, means for comparing detected above-band noise components to said threshold voltage and means for developing indications of singal-to-noise ratio below a predetermined acceptable limit.

12. The combination according to claim 11 wherein:

said second means comprises means for developing a second reference wave at a frequency of the order of 100 KHz.

13. The combination according to claim 12 wherein:

said first and second means comprise frequency dividing means coupled to said oscillator.

14. The combination according to claim 13 wherein:

said first and second frequency dividing means comprise bistable counters coupled to said oscillator for producing frequency divided outputs in fixed time relation with said fundamental frequency component.

15. The combination according to claim 1 wherein:

said second means comprises means for producing said second reference wave at a frequency equal to said subcarrier frequency, and said additional synchronous detection means is coupled to said second means and to said signal coupling means for synchronously detecting the modulation information of said suppressed subcarrier component.

16. The combination according to claim 15 wherein:

said composite signal is a stereophonic frequency modulation composite signal further comprising an audio sum signal component and said suppressed subcarrier component is modulated with audio difference signals.

17. The combination according to claim 16 wherein:

said additional synchronous detection means comprises signal matrixing means coupled to said signal coupling means for combining the detected modulation information of said suppressed subcarrier component and said sum signal component to produce stereophonically related audio signals.

18. The combination according to claim 17 wherein:

said signal coupling means is direct coupled to said matrixing means.

19. In a radio receiver for developing signals from a received transmission including a carrier wave frequency modulated by a composite stereophonic signal comprising at least an audio sum signal component, a suppressed subcarrier component amplitude modulated by audio difference signals and a pilot component having a predetermined time and frequency relationship with respect to said subcarrier, the combination comprising:

a controllable oscillator for providing a recurring wave having a fundamental frequency component equal to an even harmonic of said pilot signal;

a plurality of bistable counters coupled to said oscillator including first frequency dividing means for producing a first reference wave in synchronism with said recurring wave and at a frequency equal to that of said pilot signal;

signal coupling means for direct coupling signals extending over substantially the entire frequency range of said composite signals;

synchronous phase detection means coupled to said first frequency dividing means and direct coupled in a balanced manner to said signal coupling means for developing control signals representative of deviations from quadrature phase relation between said first reference wave and said pilot signal;

means coupled to said oscillator and responsive to said control signals for varying the phase and frequency of said oscillator to maintain said fundamental frequency component at said even harmonic frequency and to maintain said quadrature phase relation between said first reference wave and pilot signals;

said plurality of bistable counters further comprising second frequency dividing means for producing a second reference wave in synchronism with said first reference wave and at a frequency equal to that of said suppressed subcarrier; and additional synchronous detection means comprising at least a first synchronous detector coupled to said second frequency dividing means and to said signal coupling means for detecting said audio difference signals.

20. In a radio receiver for developing signals from a received transmission including a carrier wave frequency modulated by a composite stereophonic signal comprising at least an audio sum signal component, a suppressed subcarrier component amplitude modulated by audio difference signals and a pilot component having a predetermined time and frequency relationship with respect to said subcarrier, the combination comprising:

a controllable oscillator for providing a recurring wave having a fundamental frequency component equal to an even harmonic of said pilot signal;

a plurality of bistable counters coupled to said oscillator including first frequency dividing means for producing a first reference wave in synchronism with said recurring wave and at a frequency equal to that of said pilot signal;

signal coupling means for direct coupling signals extending over substantially the entire frequency range of said composite signal;

synchronous phase detection means coupled to said first frequency dividing means and to said signal coupling means for developing control signals representative of deviations from quadrature phase relation between said first reference wave and said pilot signal;

means coupled to said oscillator and responsive to said control signals for varying the phase and frequency of said oscillator to maintain said fundamental frequency component at said even harmonic frequency and to maintain said quadrature phase relation between said first reference wave and pilot signals;

said plurality of bistable counters further comprising second frequency dividing means for producing a second reference wave in synchronism with said first reference wave and at a frequency equal to that of said suppressed subcarrier;

additional synchronous detection means comprising at least a first synchronous detector coupled to said second frequency dividing means and to said signal coupling means for detecting said audio difference signals;

said plurality of bistable counters further comprising fourth frequency dividing means for producing a fourth reference wave in synchronism with said recurring wave and at a frequency above the highest signal frequency of said composite signal;

said additional synchronous detection means further comprising a third synchronous detector coupled to said fourth frequency dividing means and to said signal coupling means for producing indications of presence of above-band noise in said composite signals.

21. In a radio receiver for developing signals from a received transmission including a carrier wave frequency modulated by a composite stereophonic signal comprising at least an audio sum signal component, a suppressed subcarrier component amplitude modulated by audio difference signals and a pilot component having a predetermined time and frequency relationship with respect to said subcarrier, the combination comprising:

a controllable oscillator for providing a recurring wave having a fundamental frequency component equal to an even harmonic of said pilot signal;

a plurality of bistable counters coupled to said oscillator including first frequency dividing means for producing a first reference wave in synchronism with said recurring wave and at a frequency equal to that of said pilot signal;

signal coupling means for direct coupling signals extending over substantially the entire frequency range of said composite signals;

synchronous phase detection means coupled to said first frequency dividing means and to said signal coupling means for developing control signals representative of deviations from quadrature phase relation between said first reference wave and said pilot signal;

means coupled to said oscillator and responsive to said control signals for varying the phase and frequency of said oscillator to maintain said fundamental frequency component at said even harmonic frequency and to maintain said quadrature phase relation between said first reference wave and pilot signals;

said plurality of bistable counters further comprising second frequency dividing means for producing a second reference wave in synchronism with said first reference wave and at a frequency equal to that of said suppressed subcarrier; and additional synchronous detection means comprising at least a first synchronous detector coupled to said second frequency dividing means and to said signal coupling means for detecting said audio difference signals;

said plurality of bistable counters further comprising third frequency dividing means for producing a third reference wave in synchronism with said recurring wave, at a frequency equal to that of said pilot signal and in quadrature phase relationship with said first reference wave;

said additional synchronous detection means further comprising a second synchronous detector coupled to said third frequency dividing means and to said signal coupling means for producing indications of the presence of said pilot component.

22. The combination according to claim 21 wherein:

said additional synchronous detection means further comprises switching means coupled to said second synchronous detector for enabling operation of said first synchronous detector in response to indications of presence of said pilot component and for disabling operation thereof in the absence of said pilot component.

23. The combination according to claim 21 wherein:

said plurality of bistable counters further comprises fourth frequency dividing means for producing a fourth reference wave in synchronism with said recurring wave and at a frequency above the highest signal frequency of said composite signal;

said additional synchronous detection means further comprising a third synchronous detector coupled to said fourth frequency dividing means and to said signal coupling means for producing indications of presence of above-band noise in said composite signals.

24. The combination according to claim 23 wherein:

said first synchronous detector further comprises switching means coupled to said second and third synchronous detectors for enabling operation of said first synchronous detector in response to indications of presence of said pilot component and absence of unacceptable noise components and for disabling operation of said first detector in the absence of said pilot component or the presence of unacceptable noise components.

25. The combination according to claim 21 wherein:

said bistable counters are direct coupled to said oscillator and to said synchronous detection means.

26. The combination according to claim 25 wherein:

said signal coupling means are direct coupled to said synchronous detection means.

27. The combination according to claim 19 and further comprising:

signal matrixing means coupled to said signal coupling means and to said first synchronous detector for developing stereophonically related audio signals.

28. The combination according to claim 27 wherein:

said signal coupling means is direct coupled to said first synchronous detector and to said signal matrixing means.

29. The combination according to claim 28 wherein:

said bistable counters are direct coupled to said oscillator and to said synchronous detection means.

30. In a radio receiver for developing signals from a received transmission including a carrier wave modulated by a composite signal comprising at least a modulated suppressed subcarrier component and a pilot component having a predetermined time and frequency relationship with respect to said subcarrier, the combination comprising:

oscillator means for providing a recurring wave having a fundamental frequency component;

frequency dividing means comprising bistable counter means coupled to said oscillator means for producing a reference wave in timed relation with and at a submultiple (1/M) of said fundamental frequency component, where M is an integer greater than one;

signal coupling means for coupling signals extending over substantially the entire frequency range of said composite signals;

synchronous phase detection means coupled to said frequency dividing means and direct coupled in a balanced manner to said signal coupling means for developing control signals representative of phase differences between said reference wave and said pilot component, and means coupled to said oscillator means and responsive to said control signals for varying the phase and frequency of said oscillator means to maintain said fundamental frequency component at a frequency equal to M times said pilot component frequency and to maintain said recurring wave in predetermined timed relation with respect to said pilot component.

31. The combination according to claim 30 wherein:

said synchronous phase detection means is arranged to develop control signals representative of deviations from quadrature phase relationship between said reference and pilot components.

32. The combination according to claim 31 wherein:

said integer M is selected such that the frequencies of said reference wave and pilot component are substantially equal.

33. The combination according to claim 32 wherein:

said composite signal comprises a stereophonic composite signal further including audio sum signals and said suppressed subcarrier component includes audio difference signal information;

said signal coupling means being arranged to couple signals extending over a frequency range of at least 0 to 53 KHz.

34. The combination according to claim 33 wherein:

M is an even integer.

* * * * *

UNITED STATES PATENT OFFICE
CERTIFICATE OF CORRECTION

Patent No. 3,798,376 Dated March 19, 1974

Inventor(s) Allen LeRoy Limberg

It is certified that error appears in the above-identified patent and that said Letters Patent are hereby corrected as shown below:

Column 3, line 11, "oscillator waveform" should read -- oscillator output waveform --; lines 35-36, "components components R)" should read -- components (L-R) --; line 52, "90 KHz" should read -- 19 KHz --. Column 8, line 27, "66" should read -- 68 --. Column 15, line 58, "resistor" should read -- transistor --. Column 16, line 64, "(not signal)" should read -- (no signal) --. Column 17, line 1, "voltabe" should read -- voltage --. Column 20, line 7, "$T_5$ $T_4$" should read -- $T_5$ and $T_4$ --; line 12, "(BX)" should read -- B+ --. Column 21, line 19, "snychronous" should read -- synchronous -- line 47, "tha" should read -- that --. Column 23, line 42, "uch" should read -- such --. Column 25, line 8, "765 and 769" should read -- 765 --; line 10, "operating). the" should read -- operating). The --; line 11, "765 and 769 are" should read -- 765 are --. Column 27, line 2, "31" should read -- 312 --. Column 29, line 17, "Swtiching" should read -- [illegible]itching --; line 50, "$\overline{E+F+D}$." should read -- $\overline{\overline{E+F+D}}$ --. Column 32, line 59, "terminal T." should read -- terminal $T_8$ --. Column 33, line 45, "944" should read -- 955 --. Column 34, line 56, "847" should read -- 947 --. Column 35, line 61, "arranged and automatically" should read -- arranged automatically --. Column 37, line 26, "25" should read -- 26 --; line 27, "36" should read -- 26 --. Column 40, line 56, "singal-to-" should read -- signal-to- --.

Signed and sealed this 27th day of August 1974

(SEAL)
Attest:

McCOY M. GIBSON, JR.
Attesting Officer

C. MARSAHLL DANN
Commissioner of Patents